United States Patent [19]

Stoffel et al.

[11] Patent Number: 4,536,874
[45] Date of Patent: Aug. 20, 1985

[54] BANDWIDTH EFFICIENT MULTIPOINT DATA COMMUNICATION SYSTEM

[76] Inventors: James C. Stoffel, 368 Council Rock Ave., Rochester, N.Y. 14610; Chander B. Ramchandani, 1107 Bettstrail Way, Potomac, Md. 20854

[21] Appl. No.: 515,696

[22] Filed: Jul. 21, 1983

[51] Int. Cl.³ .............................................. H04J 3/02
[52] U.S. Cl. ...................................... 370/85; 370/94; 340/825.5
[58] Field of Search ....................... 370/85, 89, 95, 94, 370/96, 90; 340/825.5, 825.51

[56] References Cited

U.S. PATENT DOCUMENTS

| | | | |
|---|---|---|---|
| 4,293,948 | 10/1981 | Soderblom | 370/89 |
| 4,445,116 | 4/1984 | Grow | 370/89 |
| 4,459,588 | 7/1984 | Grow | 370/89 |

*Primary Examiner*—Douglas W. Olms
*Attorney, Agent, or Firm*—Perman & Green

[57] ABSTRACT

Apparatus and method are described for a data communication network which has topological independence, low variance service time distributions, potentially guaranteed maximum time to transmit, easy expansion and high error tolerance.

The network access control is fundamentally a permit (token) based system. This yields highly efficient utilization of the channel and powerful control over priorities on access to the network. In addition, a contention based scheme is provided to enable error recovery, startup, and restart to be fast and reliable.

21 Claims, 16 Drawing Figures

FIGURE 3.

| 300 | TYPE 01 | SENDER ADDRESS | DESTINATION ADDRESS | PERMIT

| 305 | TYPE 02 | SENDER ADDRESS | DESTINATION ADDRESS | ACKNOWLEDGE PERMIT (AP)

| 315 | TYPE 03 | SENDER ADDRESS | DESTINATION ADDRESS | REQUEST TO TRANSMIT - POINT TO POINT (RQT)

| 317 | TYPE 04 | SENDER ADDRESS | DESTINATION ADDRESSES 1-4 | REQUEST TO TRANSMIT MULTIPOINT (RQT)

FIGURE 3A.

| 320 | TYPE 05 | SENDER ADDRESS | DESTINATION ADDRESS | ACKNOWLEDGE DATA TRANSMISSION (DA) |

| 325 | TYPE 06 | SENDER ADDRESS | DESTINATION ADDRESS | NOT READY TO RECEIVE (NR) |

| 330 | TYPE 07 | SENDER ADDRESS | DESTINATION ADDRESS | READY TO RECEIVE (RR) |

| 335 | TYPE 08 | SENDER ADDRESS | DESTINATION ADDRESS | NEGATIVE DATA ACKNOWLEDGEMENT (ND) |

| 340 | TYPE 09 | SENDER ADDRESS | DESTINATION ADDRESS | SOLICIT ACKNOWLEDGEMENT FOR DATA (SA) |

FIGURE 3B.

| 350 | TYPE 10 | SENDER ADDRESS | DEST. ADDRESS | PACKET SEQ. NO. |

| NEXT PKT. SEQ. NO. | DATA | ERROR DETECTION | DATA PACKET – POINT-TO-POINT

| 355 | TYPE 11 | SENDER ADDR. | DEST. ADD.1 | DEST. ADD.2 | DEST. ADD.3 |

| DEST. ADD. 4 | PKT. SQ. NO. | NEXT PKT. SQ. NO. | DATA | ERROR DETECT. | MULTIPOINT DATA PACKET

FIGURE 4. STATE TRANSITIONS
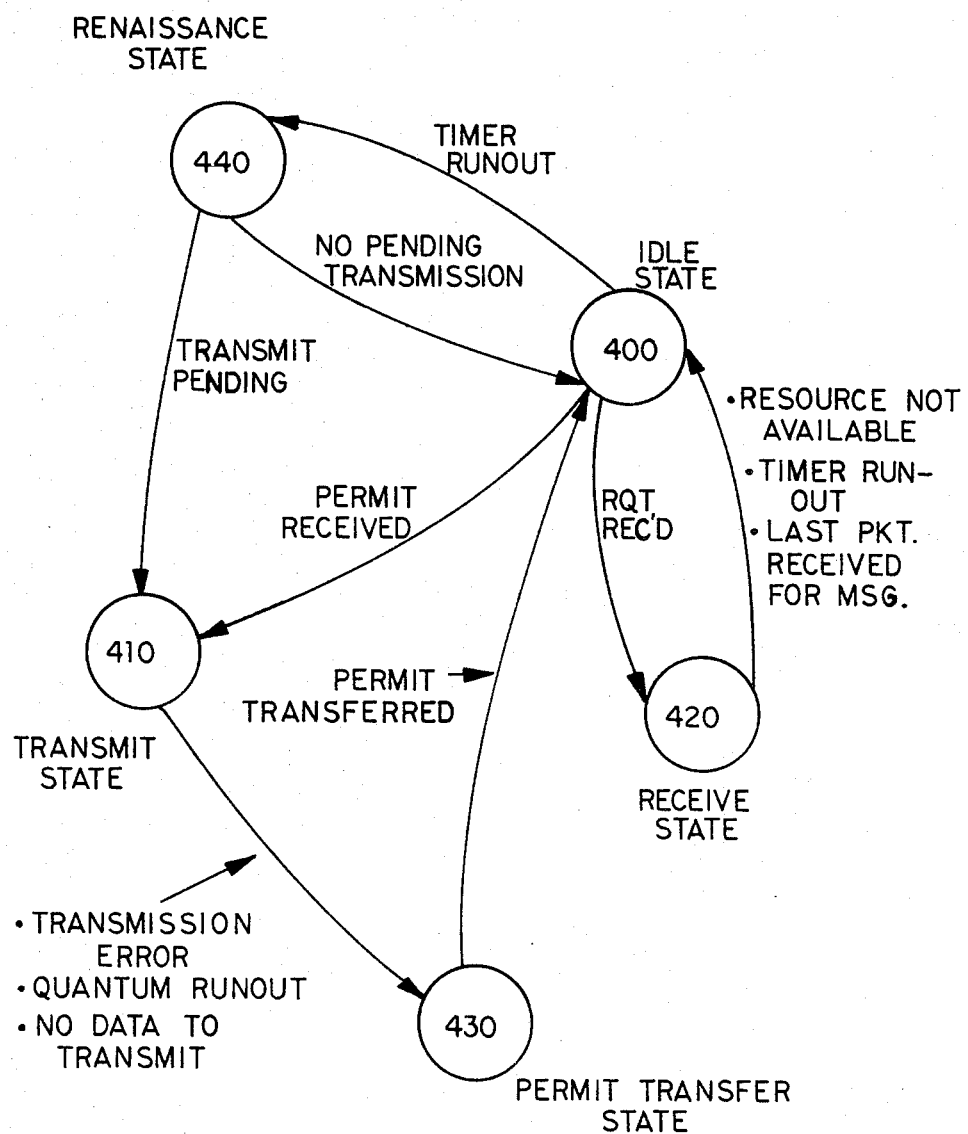

FIGURE 5. IDLE STATE
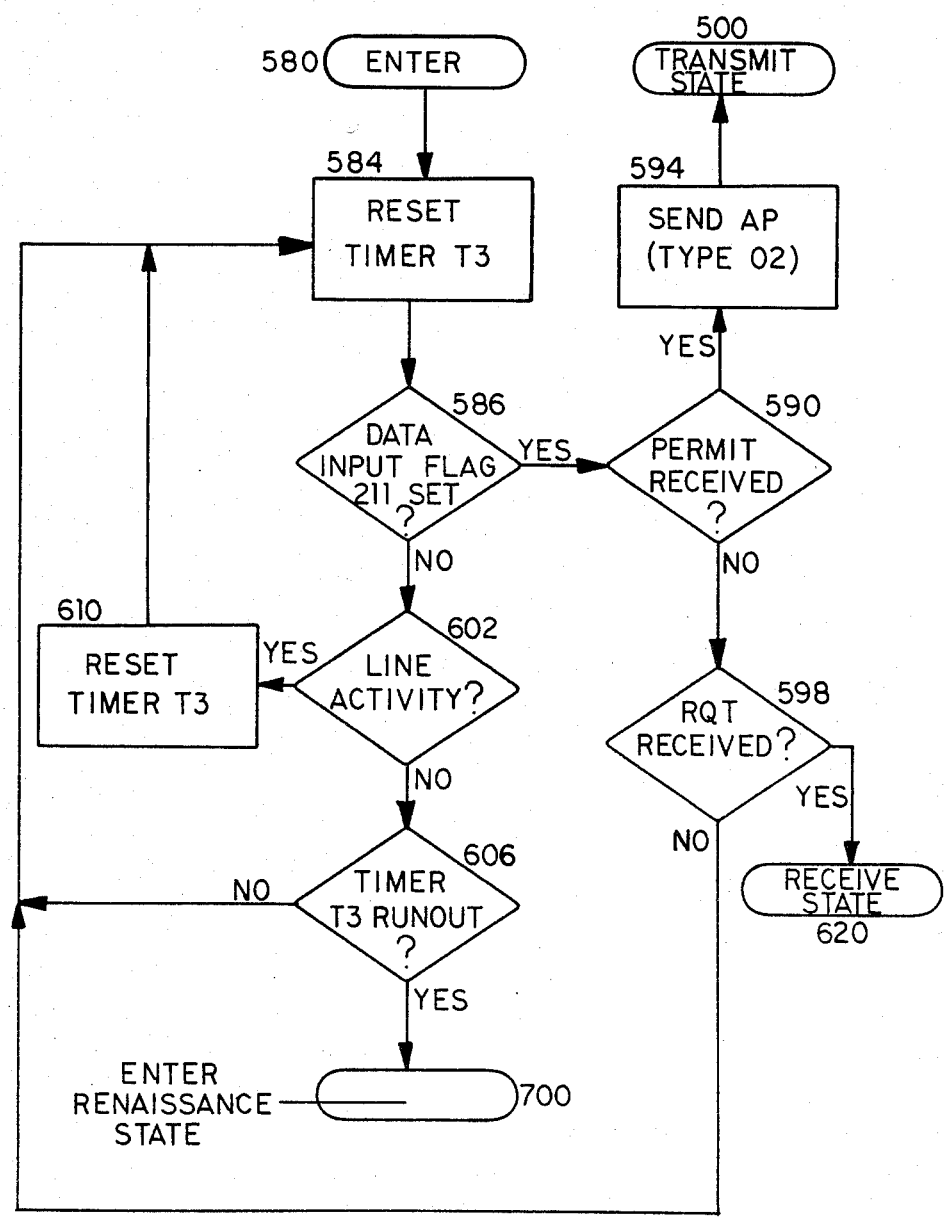

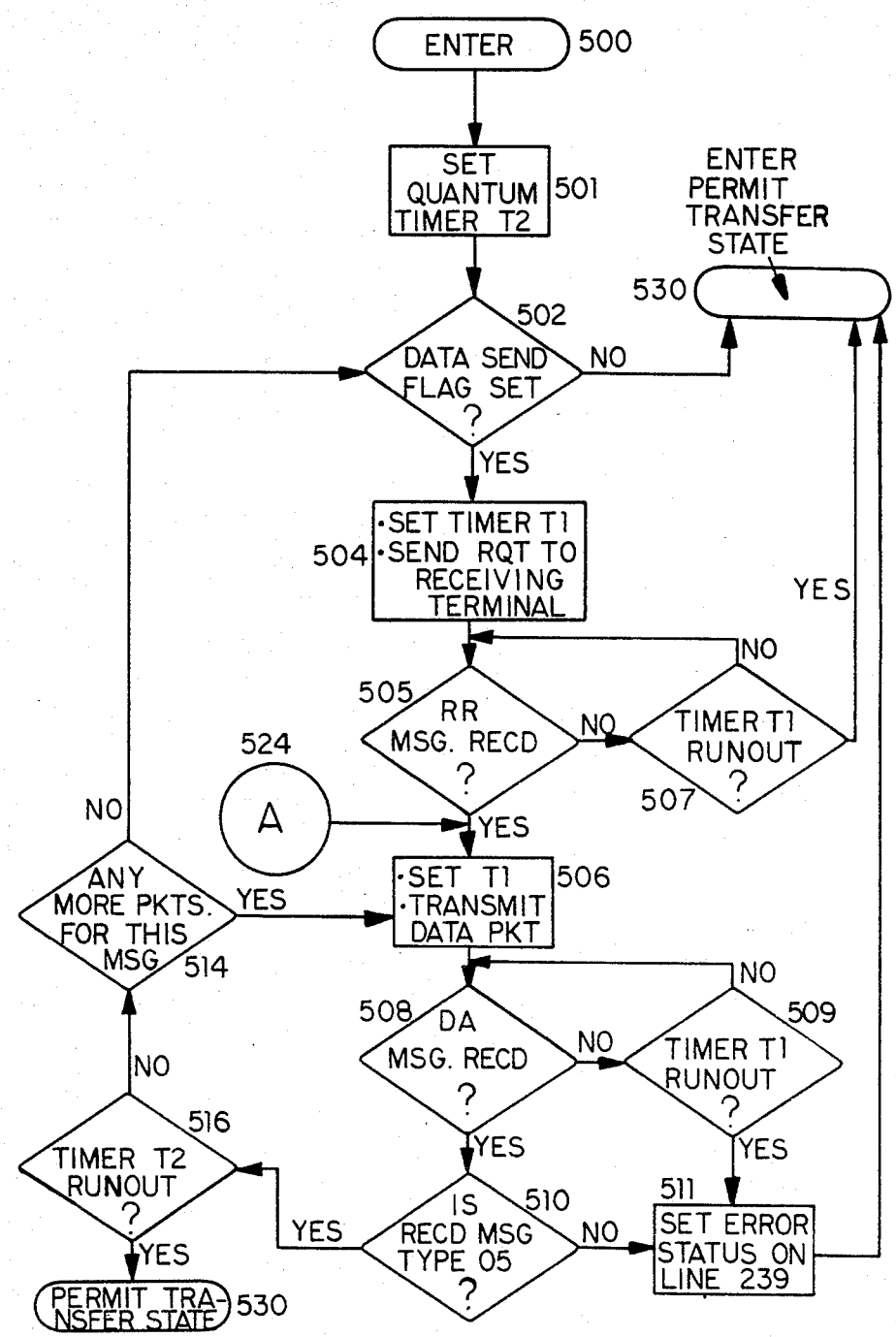
FIGURE 6. TRANSMIT STATE

FIGURE 7. PERMIT TRANSFER STATE
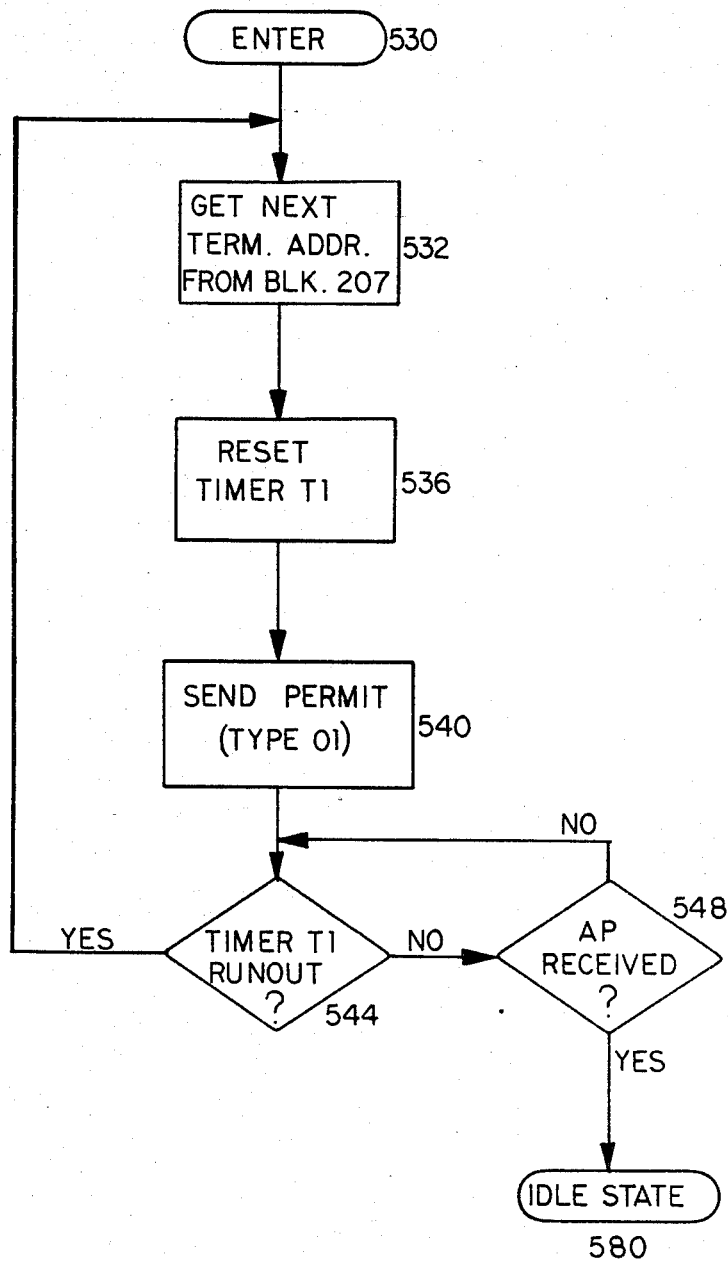

FIGURE 8. RECEIVE STATE
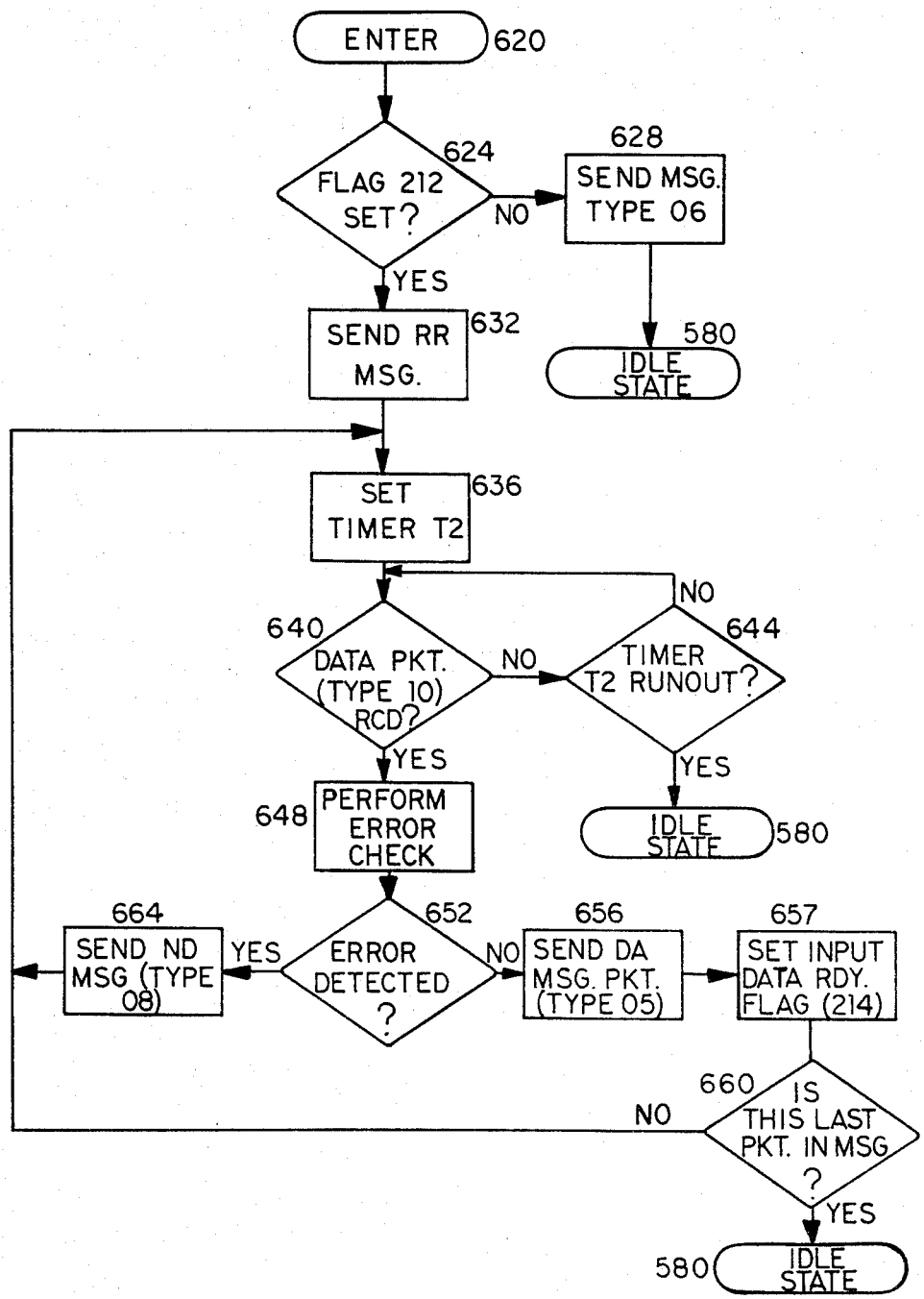

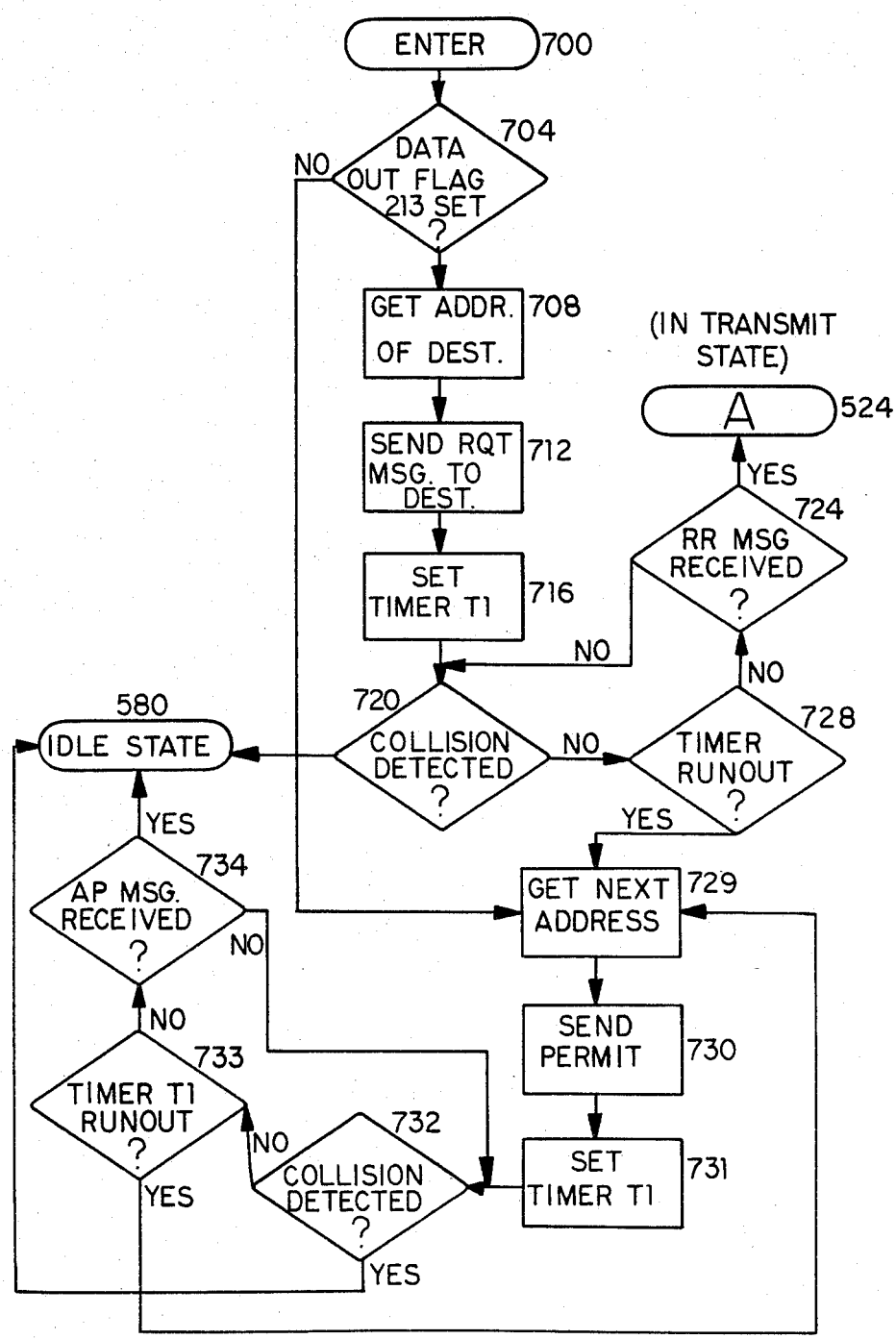
FIGURE 9. RENAISSANCE STATE

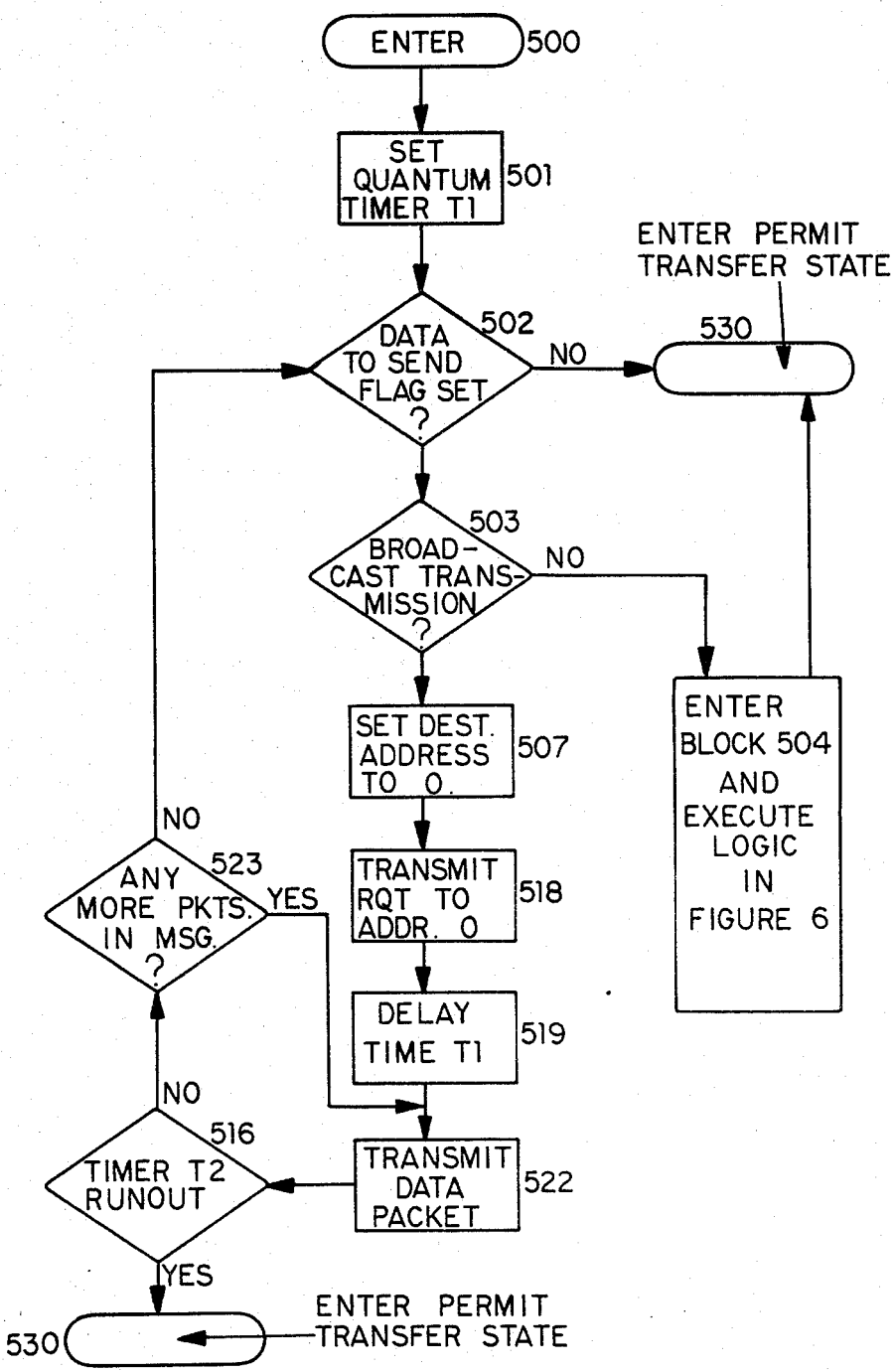
FIGURE 10. BROADCAST TRANSMIT STATE

FIGURE 11. RECEIVE STATE WITH BROADCAST
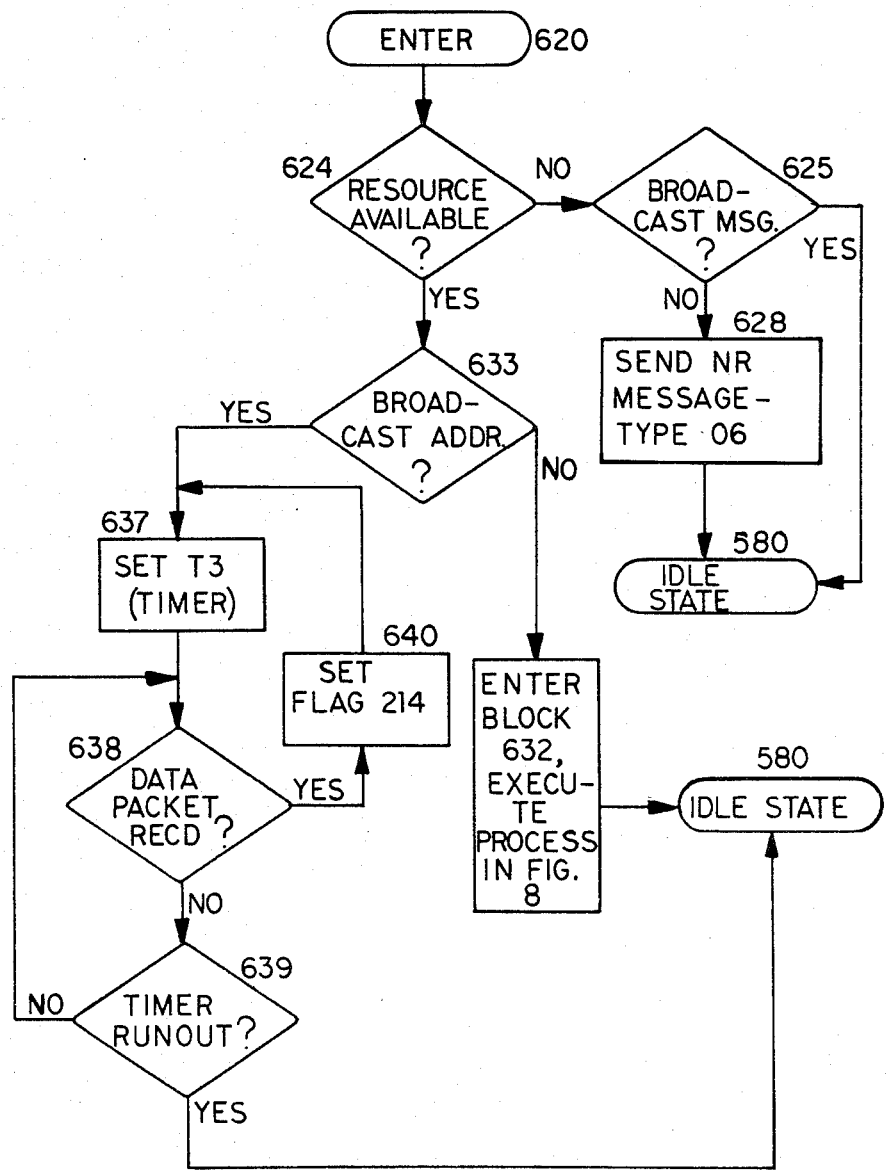

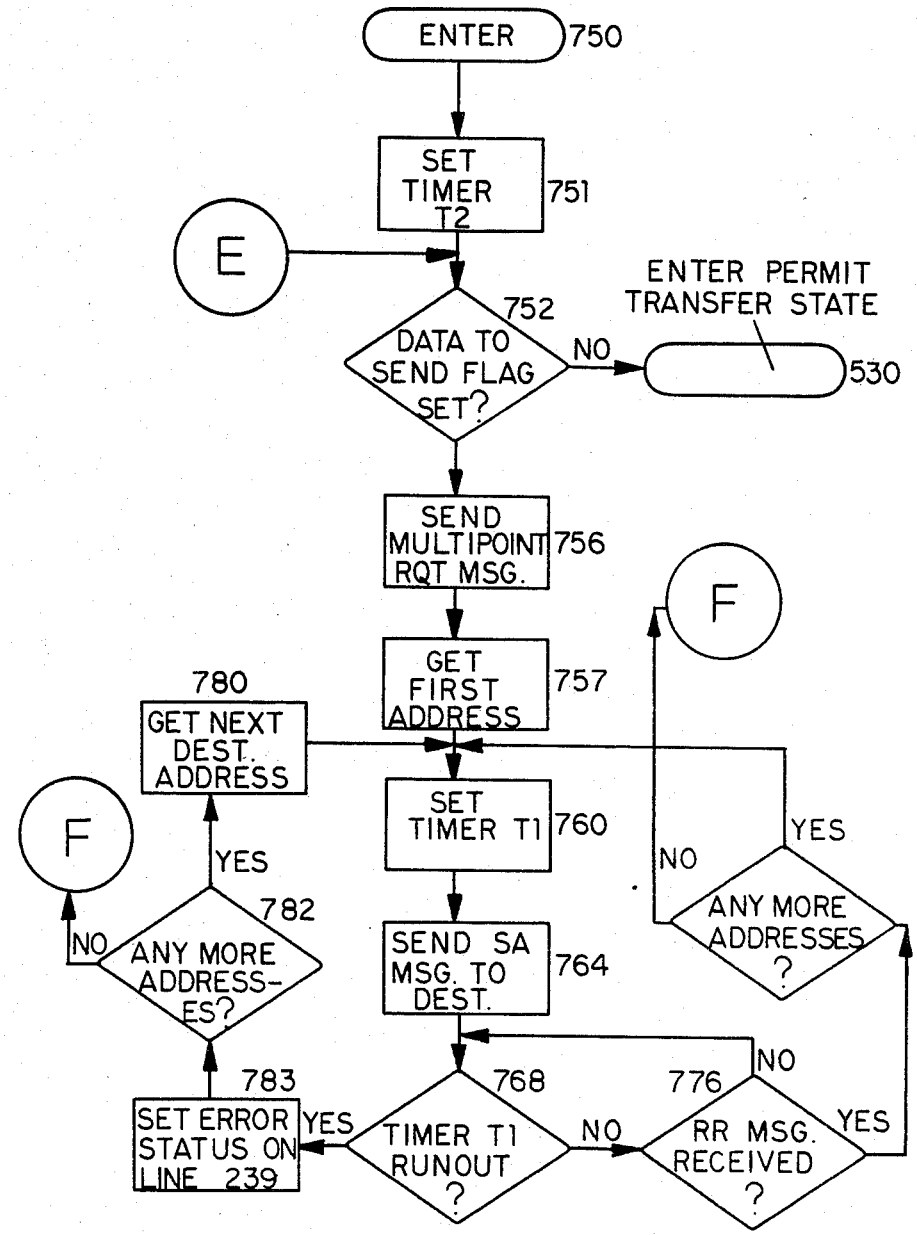
FIGURE 12 TRANSMIT STATE FOR MULTIPOINT COMMUNICATIONS

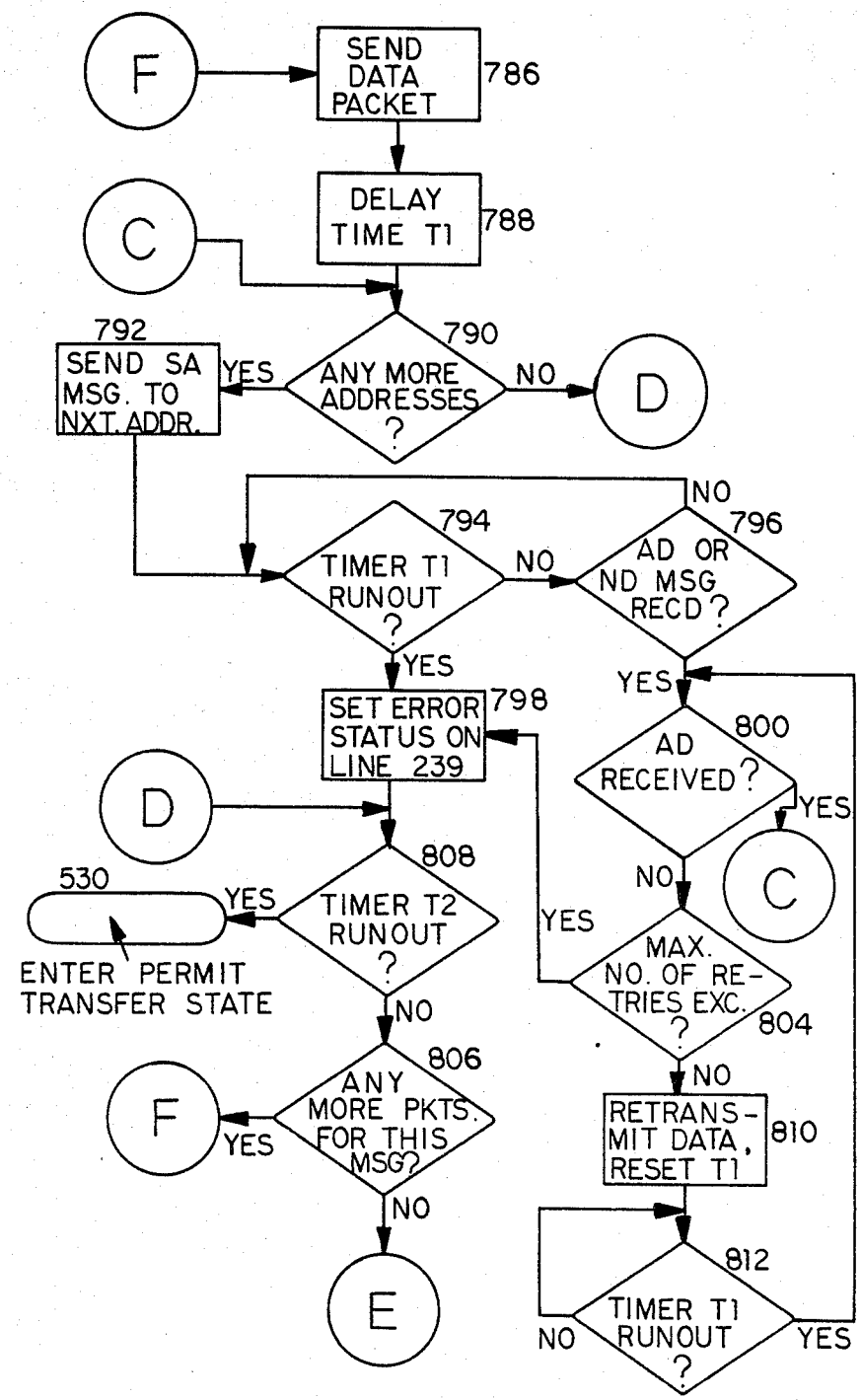
FIGURE 12, CONT'D

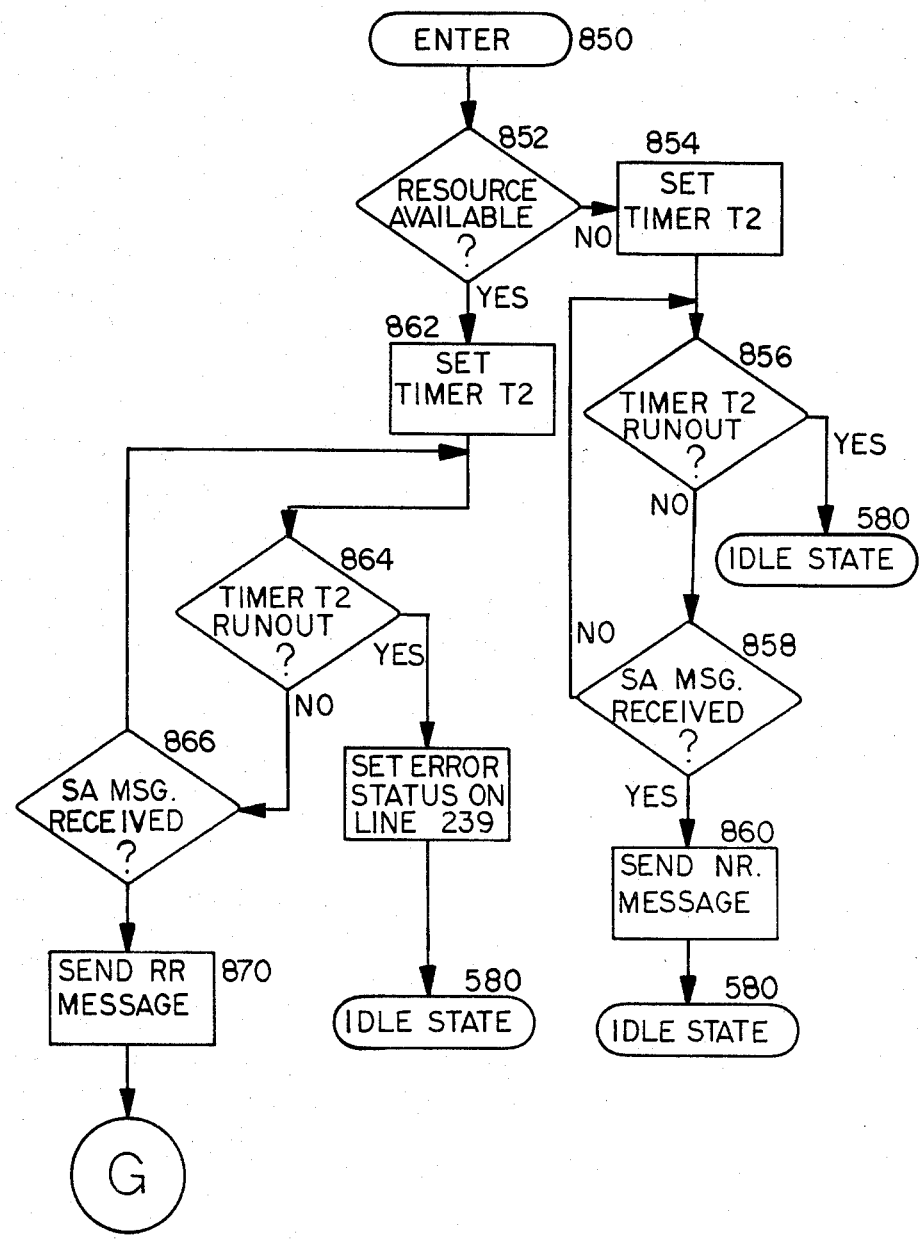
FIGURE 13. RECEIVE STATE FOR MULTIPOINT COMMUNICATIONS

FIGURE 13, CONT'D
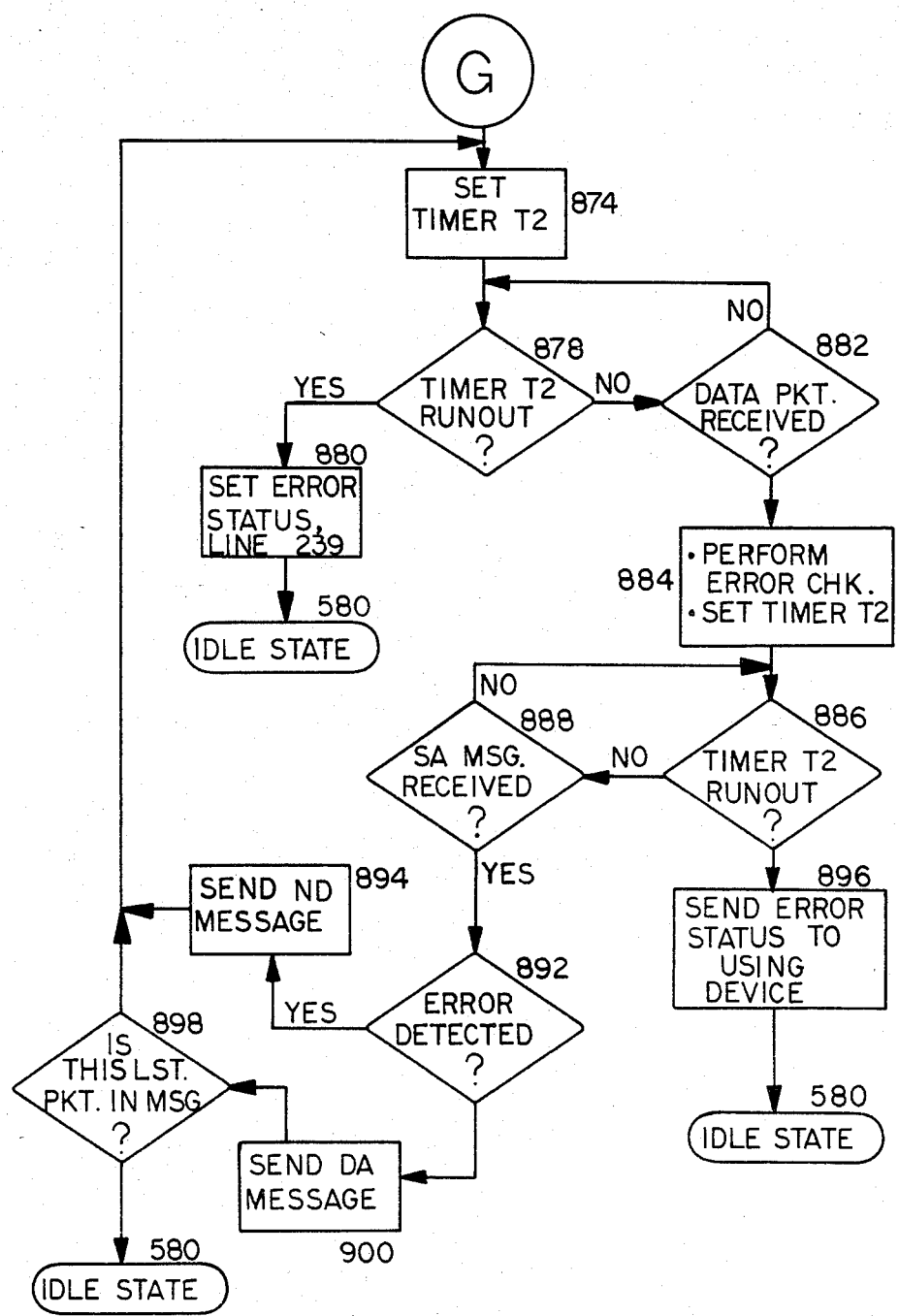

BANDWIDTH EFFICIENT MULTIPOINT DATA COMMUNICATION SYSTEM

BACKGROUND OF THE INVENTION

The present invention relates to data communication systems, and, more particularly, to data communications systems which are based on data packet switching.

Prior art local area networks have consisted of a number of strategies for the allocation of bandwidth. These strategies can be divided into the following categories: Centralized control, Distributed, Contention based access control, and Distributed, Noncontention access control.

Centralized Control

The earliest digital communication systems utilized a central processor to allocate access control to a terminal or node. These historically had the topology of a star or a loop network, and nodes began to include other computers. Prior art, centralized control networks are exemplified by a ring-oriented network that is disclosed by Olof Soderblom (U.S. Pat. No. 4,293,948) wherein the topology of the network is necessarily restricted to be a closed loop. Each terminal consists of a receiver and a retransmitter interposed in the communications link. This scheme has two inherent weaknesses.

(a) Each terminal interface constitutes a single point of failure (b) Each transmission with acknowledgement incurs a full loop time delay

Distributed Contention

One of the earliest distributed, contention based access networks was the "ALOHA" satellite communication system developed by the University of Hawaii, designed primarily for interconnection of geographically dispersed computer terminals with a central computer system. In this and some other systems, each communicating node sensed transmission activity on the channel and when the channel was found idle, transmitted a block of data, suitably encoded. Owing to transmission delays on the channel, collisions would occur when nodes transmitted their data blocks nearly simultaneously.

In order to reduce the effects of collisions on the channel, Metcalfe, et al disclosed a scheme (U.S. Pat. No. 4,063,220) whereby nodes can detect collisions on a channel. Each node ceases transmission, and after a random time interval, commences retransmission. This scheme, now productized as the Xerox ETEHERNET, a trademark of Xerox Corp., is quite efficient for lightly load communications lines. As traffic on the network increases, increased contention and retransmission occurs, resulting in poorer performance. Large delays can be observed by certain nodes, and statistically the variance in the time to complete a job increases significantly. In addition, the scheme may fail when transmission of data must occur with some real time constraints such as an upper bound on the time to complete a transmission. Furthermore, the scheme does not enable priority transmissions from on the network.

The network control protocol of Malcolm et al (U.S. Pat. No. 4,332,027) is an attempt at simplifying the complex collision detection mechanism of the Ethernet, It attempts to resynchronize the set of nodes on the network by forcing a waiting period for all nodes in an Ethernet, type network. This however does not eliminate collisions, and there remain the random access characteristics in the network.

Another approach to distributed control is represented by the system of Hopkins et al (U.S. Pat. No. 4,161,786) which utilizes a time division multiple access pair of unidirectional communication busses. The two unidirectional communication paths are both needed to form the highway for communication. Time is broken down into slots for communicating packets of information. These slots are of two classes, those permanently assigned and those available for general use wherein the right to use is determined by contention with collisions. Slot allocations to these two classes may be performed dynamically. This system is complex, requiring relatively expensive transceivers and two topologically constrained communication media (cables in this case). Furthermore, is relies on the coordination of a system clock for slot definition.

A follow on patent by Hopkins et al (U.S. Pat. No. 4,210,780) provides an unslotted, contention based access protocol for the above described pair of unidirectional busses. The access protocol utilizes a listen while talk methodology, but it continues to have collisions and it furthermore is restricted to relatively expensive RF(nonbasedband) carrier based transceivers.

Distributed, Noncontention

The network of Jensen et al (U.S. Pat. No. 4,229,792) provides a distributed access control mechanism that does not utilize contention. This system utilizes a counter and an access vector in each node of the network. The counter simply designates the position in the access vector that is currently being used throughout the network. The access vector is defined for each node to be a "1" when it should utilize the channel. At the end of a correct communication, the transmitter then in control broadcasts an updata signal to all nodes wherein all nodes add "1" to their counters, incrementing the current position pointer for the access vector. A terminal then takes control of the channel if its access vector has a "1" in the position now being shown by the counter.

The problem with this network is that it is very intolerant of failures in a single node, all nodes must be counting correctly and in synchronization. Furthermore, expanding or altering the network requires reinitializing the access vectors in all the nodes.

Another concept for distributed, noncontention network access is that of Eswaran (U.S. Pat. No. 4,292,623). It provides asynchronous, distributed, collision free communication by implementing a parallel control wire along with the single communication wire. The system has the strength that it makes more efficient use of the channel bandwidth than the contention based networks with collisions and in one implementation it can guarantee a maximum time to transmit a given message. On the other hand, the network now requires an additional "control" wire, with its additional failure modes; and there is the constraint that the network be a single, nonbranching, bus that has unidirectional logic flow in its control wire. This makes future expansion of the network difficult since the topology is a single line with one beginning and one end.

The distributed resolution of access control for a shared resource is also addressed by the invention of deVeer et al (U.S. Pat. No. 4,320,502). It utilizes a common bus of multiple wires including a clock to coordinate the transmission of information and the resolution of which node has control for the next time block. The system has the advantage of enabling complex priorities to be established for nodes but there are constraints on the flexibility and future expandability of the system since it is a multiwire, bus with no branching. Furthermore, the system is relatively intolerant of failures and yet remains complex, having no error recovery mode; and distributing a clock over potentially long distances attempting to coordinate with signals in other wires.

SUMMARY OF THE INVENTION

During the early development of local area networks, a number of constraints were detected that restricted the potency of these otherwise powerful concepts. Proposed systems had shortcomings including:

1. Large variances in the time to complete tasks were observed, especially for large file transfers.
2. No guarantees on the maximum time that would be required to complete a communication, nor any method to provide an upper bound.
3. No method to impose a priority of service in the communication network.

For these reasons, a network protocol and access procedure was developed to solve many of the aforementioned problems.

It is an object of the present invention to present a network that is not restricted to a ring, star or other constrained topology, and that is not costly to install alter or expand in the future.

It is another object of the present invention to provide a network with distributed access control.

It is a further object of the present invention to reduce the possibility of any node being a single point of failure in the communications system.

It is another object of the present invention to essentially eliminate inefficient contention (collisions) for normal channel access.

It is another object of the present invention to provide a method to guarantee a maximum time to transmit a given message thereby enabling certain time constrained communications such as telephone and page synchronous electronic printers.

It is a further object of the present invention to provide a method for regulating the time quantum allocated for transmission by a given node in the network.

It is also an object of the present invention to facilitate a variety of prioritization mechanisms.

It is also an object of the present invention to provide for addition and deletion of a node to the channel automatically, i.e., without the need to reinitialize the network nodes or communicate this information to each node.

In order to satisfy the above mentioned objectives, the present invention includes a shared bidirectional communications medium, and transceivers that enable the interfacing of devices desiring to communicate over the local area network. Such devices may be computers, computer terminals, facsimile devices, digitized telephones, input page scanners, printers and other digital using devices.

The key characteristics of the communication system of the invention are:

1. Topological Independence: The communication media (wires in most cases) can be laid out in arbitrary configurations. No constraint of a physical "loop" or a "star" structure need be imposed. Also, the network can be expanded economically with the dominant topological constraint being the given environment (office work space, factory, etc.) instead of the network, since arbitrary branching topologies are possible using the current invention.
2. Distributed Access: The network allows for access to the communication resource to be determined via distributed processors, instead of through a centralized control such as a mainframe computer or processor.
3. The Network is Selfpolling: The distributed processors themselves perform the allocation of the communication resource. No list of network nodes needs to be kept by any one node.
4. Permit Based: The access to the network is enabled by a "permit" to use the resource. It is not normally a contention based resource allocation system with collisions potentially occurring, and therefore it facilitates guaranteeing a maximum time to transmit.
5. Automatic Error Recovery/Startup/Expansion The network can recover from transmission errors and transceiver malfunctions automatically, enabling robust behavior. Furthermore, the system can initiate correct function after it is broken or fractioned into a smaller network, and it can add or delete terminals with no need to reinitialize the system.
6. Variable Time Quantized TDM: Time division multiplexing (TDM) is the fundamental method of sharing the communication resource in this invention, and the time available for each node in the network need not be restricted to equal or fixed size time allocations.
7. Priority Enabling: The system can facilitate a priorization of access to the communication resource.

A key enabler of the features of the invention is the use of a single permit (token) which exists in the network and is held at a given point in time by one of the distributed nodes. It is the ownership of the permit which allows a terminal to transmit data to other terminals. Should the node which presently holds the permit not have a queued message to transmit, it simply passes the permit to another terminal. The permit thus moves around the network in a round-robin or like sequence, enabling each terminal to transmit data.

Basically, the system operates by the generation of a digital signal packet containing the permit and an address. At each mode, there is located a terminal having a transceiver including permit-passing circuitry. The permit-passing circuitry stores a set of addresses of successive terminals which are to receive the permit. Upon transmission of the packet from a transceiver into the media, the designated recipient of the permit recognizes the address and acknowledges receipt of the permit by transmission of an acknowledgement signal. Control of the permit thus passes to the recipient terminal. In the event that the designated terminal is not in operation, no acknowledgement signal is generated, and the permit-passing circuitry updates the address to the following one of the stored addresses. The list of stored addresses includes unused addresses so as to enable enlargement of the number of terminals in the network. Thereby, access to the permit passes repetitively around the loop of terminals irrespectively of whether terminals are added to or detracted from the network.

BRIEF DESCRIPTION OF THE DRAWINGS

FIGS. 3, 3a and 3b show the types of packets utilized for communication between the digital utilization devices connected on the network for both point-to-point and multipoint communications.

FIG. 4 summarizes the transitions between the major states of the control logic for the transceiver and interface for a single digital utilization device. FIG. 5 shows the processing logic for the transmit state of a single transceiver and network interface.

FIG. 6 shows the processing logic for the permit transfer state for a single transceiver and network interface.

FIG. 7 shows the processing logic for the idle state for a single transceiver and network interface.

FIG. 8 shows the processing logic for the receive state for a single transceiver and network interface.

FIG. 9 shows the processing logic for the renaissance state for a single transceiver and network interface.

FIG. 10 shows the processing logic for the transmit state with broadcast capability.

FIG. 11 shows the processing logic for the receive state with broadcast capability.

FIG. 12 shows the processing logic for the transmit state for multipoint communications.

FIG. 13 shows the processing logic for the receive state for multipoint communications.

DESCRIPTION OF THE PREFERRED EMBODIMENTS

Figure 1:
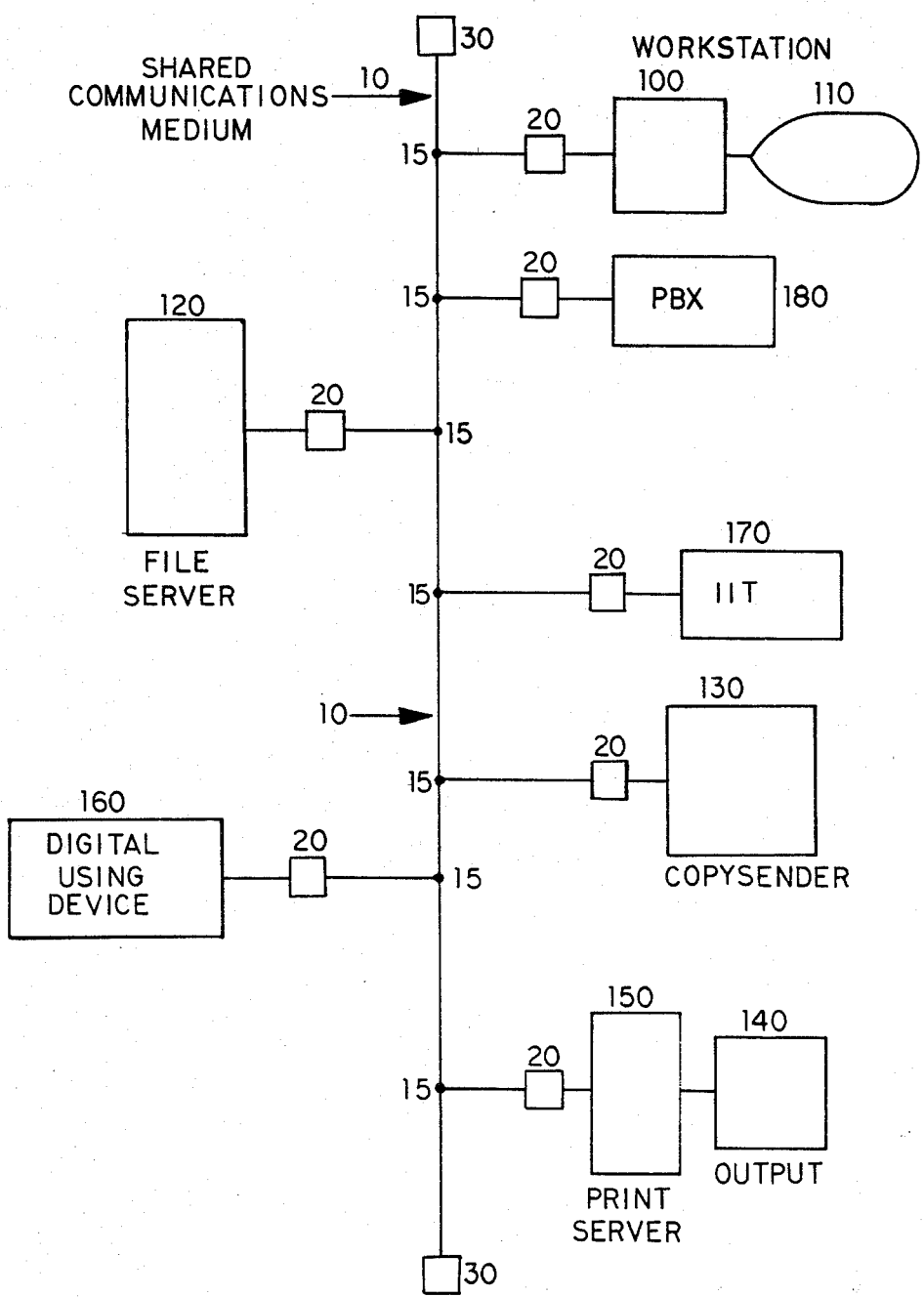
FIG. 1 shows the general arrangement of the communications network including the communications medium, a plurality of taps and transceivers for each node of the network, and a variety of digital communicating devices in block diagram form.

As shown in FIG. 1, the communication network comprises one or more shared communication medium such as cable 10. For purposes of illustrating this invention, cable 10 is a conventional, high frequency coaxial cable with terminators, 30 at each end. The terminators are conventional impedance matching devices, such as resistors, selected to limit reflections. Distributed along cable 10 are a plurality of taps 15 shown as conventional t-connectors. Associated with each tap 15 is a transceiver 20 which provides the connection for digital communication into and out of the communication medium, numeral 10.

A variety of digital devices are shown connected to the transceivers 20. A general communicating digital device is designated numeral 160 and shown in FIG. 1. In addition, a work station 110 is shown along with its processor 100 and are exemplary of a variety of small, personal, terminals which may communicate in this system. The Xerox 8012, Executive Work Station typifies such a work station. A private branch exchange is also shown connected via a transceiver 20 to the communication network. This enables an individual or a plurality of telephones to utilize the medium. A centralized memory resource, such as the file server, 120, may also be connected to the communication medium as exemplified by a Xerox 8037 File Server and illustrated in FIG. 1. Numeral 130 designates a copysender which represents a device capable of input scanning an original document, printing of that document and output in the local output tray. It is also capable of receiving from remote locations a scanned, digitized, fascimile of the original document and printing it out. Furthermore, it may act as a source of scanned imagery to be printed at a remote location by another copysender or printing device. A low resolution, simplified example of a copysender is the Xerox Telecopier 495 fascimile terminal. Another digital using device is represented by the combination of a printer 140 and its controller 150 to represent a print server. Such a device provides the output capability for printing documents sent to it from remote locations. Exemplary of this class of devices is the Xerox 2700. Also shown in FIG. 1 is an exemplary Image Input Terminal, referred as an IIT, and designated numeral 170. It acts as sources of scanned imagery to be printed out on various devices in the network such as a copysender or print server. Exemplary of this class of device is the Xerox 1050 Graphic Input Scanner.

It should be understood that the devices exemplified in this description are illustrative of the classes of digital using devices that may be attached to the communication system of this invention. These descriptions are not provided as a means of defining restrictions on the digital using devices which may be connected to the communication network of this invention.

Figure 2:
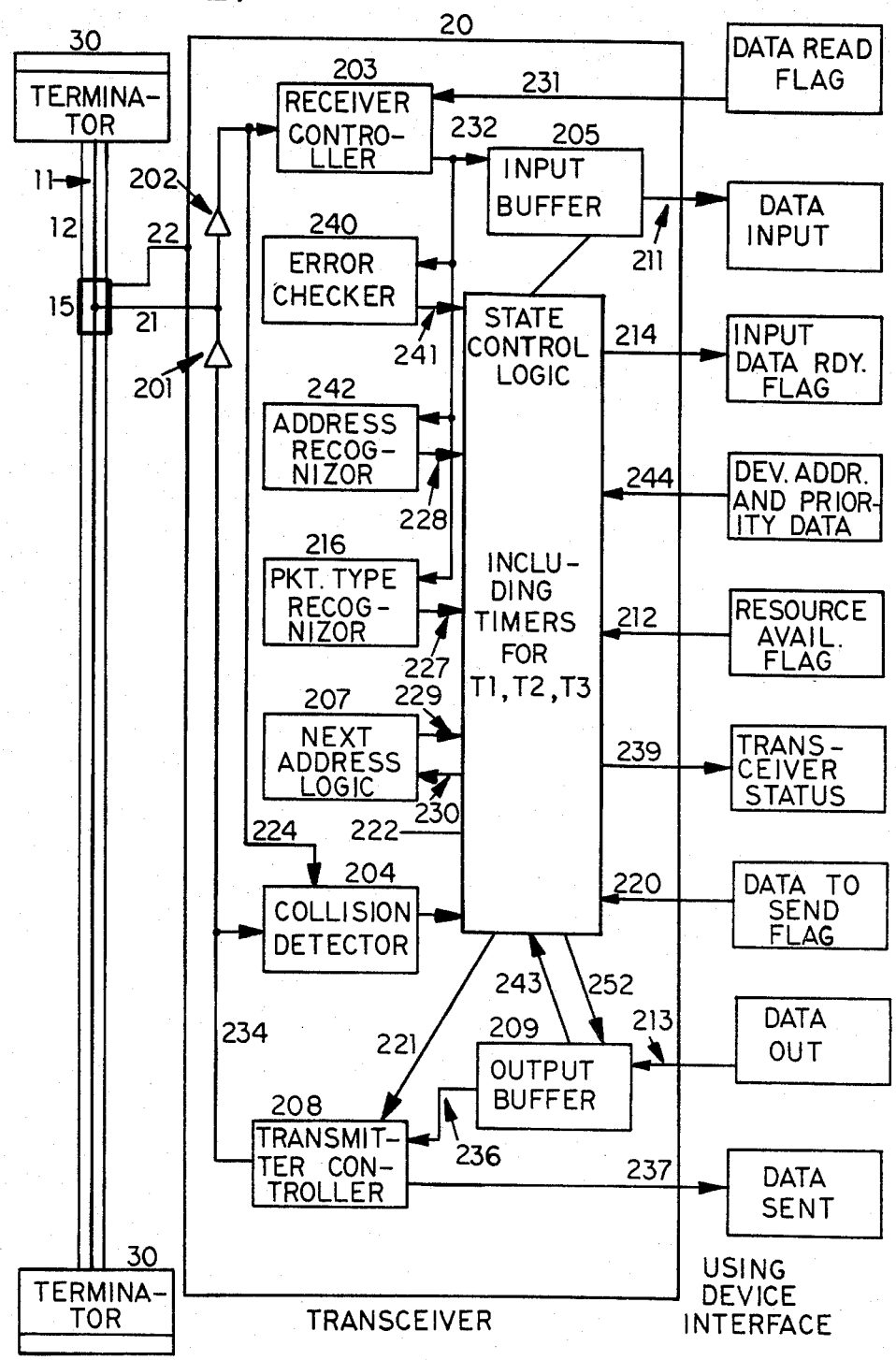
FIG. 2 shows an exemplary embodiment wherein the medium is a coaxial cable, the appropriate tap and transceiver being shown in block diagram form and providing signals and data paths for a digital utilization device.

In FIG. 2, a more detailed view of the transceiver 20 is provided. The transceiver 20 is shown connected to the communication medium via a conventional t-connector tap, 15. The central conductor 11 of the coaxial cable 10 is shown connected to the input 21 of the transceiver 20. The shield 12 of the coaxial cable is shown connected to the grounded side 22 of the transceiver 20. Transceiver 20 includes a transmitter 201 which is a driver circuit connected to the center lead of the tap 15. The receiver 202 provides signals to both the collision detector 204 and the receiver controller 203. The collision detector 204 is a circuit which listens to activity on the communication medium and will signal a collision when the transmitter controller 208 attempts to send a message at the same time that the medium has a signal on it. The collision detector 204 will also inform the state control logic 222 that the medium is in use. As herein below described, this will inhibit the transmitter controller 208 from initiating a transmission and generating a collision.

Receiver controller 203 detects the input signals to the transceiver 20, extracts a clock from the signal waveform, and generates a digital bitstream. It is assumed in this description of the invention that a Manchester encoding of the digital bitstream is utilized wherein the clock can be extracted from the signal waveform by any terminal along the medium. The receiver controller 203, therefore, is capable of generating a digital bitstream corresponding to the data that was to be sent by the source digital using device. The input buffer 205 stores one or more packets of information for presentation to the digital using device, 160. The address recognizer 242 examines the destination address encoder in the digital packet and determines whether the received data is appropriate for transmission to the digital using device 160. If the address recognizer 242 establishes that the packet has appropriate destination, it signifies that to the state control logic 222 via line 228. The state control logic 222 will check that the address recognizer 242 has determined that this digital using device is the appropriate recipient, verify that the error checker 240 signified valid data, and verify that this is a data type packet via the type recognizer 216. These conditions being met, the state controller 222 will notify the digital using device 160, via signal line 214, that data in input buffer 205 is ready to be read. The receipt of the packet types 01-09, FIGS. 3a-b, is similar to the above procedure, but no signalling of the digital using device 160 is done since these message are strictly for the network control and represent communication between transceivers. This sequence will herein below be referred to as receiving a packet.

The packet error checker 240 performs a validation of the integrity of the data in the packer. Exemplary of such a procedure is the calculation of a Cyclic Redundancy Check "word" using the received packet and a comparison of this with the CRC "word" previously computed at the source and sent along with the packet as shown in FIGS. 3a-b.

The initiation of a request for data transmission is performed by the digital using device 160. This is performed by setting the data-to-send flag 220 to the true state. To send a message, the digital using device 160 will send data, in the format of a packet described by FIGS. 3a-b, via signal path 213 to the output buffer 209. The state control logic 222 will initiate transmission when it receives the network permit which provides the right for it to utilize the medium as described herein below. When the permit is received, the state control logic 222 can initiate the transmitter controller 208 to take the data in the output buffer 209 and encode them in an appropriate signaling fashion for transmission by the driver 201. Again, an encoding technique compatible with this description is a Manchester phase encoding of both clock and data into a single waveform. Packet types 01-09 may be loaded into the output buffer 209 via signal line 252 by the state control logic 222 and transmitted as described above. These sequences will herein below be referred to as sending a packet.

The state controller logic 222 also controls all transfers of the "right to use" permit in the network. As herein below described, a network permit is passed around the network to each transceiver 20 in a defined manner. The permit gives the transceiver 20 and therefore its associated digital using device 160 the authorization to utilize the network for communication. The transceiver 20 contains a packet type recognizer 216 which will monitor the data decoded by the receiver controller 203 to detect the offering of a permit. The packet type recognizer 216 signals the state control logic 222 when it is being offered the right to use the network. According to logic herein below described, the state control logic will either begin to utilize the medium by transmitting its message on the medium, or it will transfer control to the next transceiver and the digital using device associated with that transceiver. The logic for determining the next resource to receive the permit is designated by the "next address" logic 207. In the case when a "round robin", equal priority access strategy is desired, the next address logic 207 may be a digital counter which is capable of counting through all possible addresses on the local area network. For example, an eight bit counter can span the address space of a network of 256 nodes.

In addition to the above, there are three basic time limits that are incorporated within the state control logic 222 of the transceiver 20. These time limits are provided by timers T-1, T-2, T-3 and are defined as follows:

1. t-1—this is a packet response time limit set to be slightly longer than twice the round-trip delay in a given network, for example 4 ms.
2. t-2—this is the service quantum time limit which is the constraint for a given transceiver on the amount of time it may utilize for packet transmission before it must give the network resource to another transceiver, for example 50 ms. The timer t-2 is adjustable, adjustment being provided by a switch or keyboard connecting with the timing circuit (not shown) for selecting a predetermined duration for the service time interval.
3. t-3—this is the network fault time limit which is the maximum time that a transceiver will wait in the idle state while the network is inactive before transferring to the renaissance state, for example 2 seconds.

The above description lays forth a particular medium and associated signaling and control logic. The circuit implementation is assumed to be conventional in that standard digital logic chips and circuit components are assumed for the detailed implementation. Exemplary of this class are the 7400 series of digital logic from Texas Instruments and the Intel Corp. 8085 microprocessor chip which could implement the logic of the state control as herein below described. Alternate chips and circuit elements along with signalling methodologies are possible.

FIGS. 3a-b contains a set of packets for use on the communication network of this invention. The short, control packets, numbers 300-340, are utilized for communication primarily between transceivers. Packet types 10 and 11, numbers 350 and 355, are data packets containing information for the digital using device.

For purposes of example, the packets may be thought of with the following assignment of bytes for each field of the packet:
  type—1 byte
  sender—1-byte
  destination—1-byte/destination
  packet sequence no.—2-bytes
  next packet seq. no.—2-bytes
  data—512-bytes
  error detection bits—2-bytes The following describes in detail the mechanisms for control of access by nodes to the communications channel, the transmission of data, and error control.

STATE TRANSITION LOGIC

The network access control logic is distributed throughout the network. Within each transceiver 20, distributed throughout the network, is a simple but powerful access control strategy for the communication network. This logic can be understood for FIG. 4 which outlines the major states that the transceiver can be in, as well as the transitions between the major states. It is the state control logic, designated number 222 in FIG. 2, which actually performs the state change for the transceiver 20.

The transceivers are normally in the idle state, designated number 400. If a packet is received which represents the initiation of a transmission to the digital using device, designated by a type 03 message, then the transceiver will change to the receive state 420. Provided accurate communication of the packets occurs on the network, the transceiver will remain in the receive state until the last packet of a particular message is received or packets for another message are detected. It will then return to the idle state, 400. If the digital using device 160 is not available for communication, or if the transmitter fails to send a packet within a designated time limit, then the transceiver will also return to the idle state.

For a transceiver to transmit a data packet, it must first receive the network access permit. After waiting its turn, and receiving the network access permit, the transceiver will change to the transmit state 410. Packets will then be transmitted to their appropriate destinations per the methodology outlined above describing the sending of packets via the transceiver of FIG. 2, and further described below. If a transceiver completes transmission of all available packets, or uses up the time quantum allocated to it, then the transceiver will move to the permit transfer state number 430. The permit is then handed off to the next appropriate transceiver in a method and sequence described herein below. The transceiver then returns to the idle state 400.

Should the transceiver detect via the collision detector 204 in FIG. 2 that there has been no activity on the network for a period of time in excess of some threshold, defined to be t-3 in this exposition, then the transceiver will enter the renaissance state number 440. In this state, the transceiver will attempt to communicate with any of the other transceivers that would logically be on the network. A listen while talk, contention, access strategy is utilized until either one good communication is established from that transceiver or activity reappears on the network. Should the transceiver re-establish error free communication with another transceiver, then the transceiver restarts the permit based communication protocol and moves to the transmit state 410, wherein it either transmits the next packet is has available for transmission or transfers to the permit transfer state 430 and attempts to hand the permit to the next appropriate transceiver. If, while in the renaissance state, the transceiver detects activity on the network prior to it having established error free communication with another transceiver, then the transceiver will return to the idle state 400 and again wait for the permit to be sent to it.

FIG. 4 provides a high level overview of the major states that exist in a transceiver along with the basic transitions that occur between states. The following descriptions will provide a more detailed description of the states for the transceiver along with the logic for transitions between states.

IDLE STATE

FIG. 5 shows a flow diagram of the logic for the transceiver in the idle state. Upon entering the idle state via block 580, the transceiver will reset a timer to the value t-3 and begin counting down. If a packet was received, then the input buffer designates this via line 223 (FIG. 2) to the state control logic 222. As designated via block 586 of FIG. 5, should no packets be received, then the transceiver checks, block 602, via line 225 in the transceiver of FIG. 2 whether any activity was sensed on the communication line since entering the idle state. If activity was sensed, then timer t-3 is reset and the transceiver remains in the idle state checking for data input as shown in block 586. If network activity was sensed, timer t-3 is examined as shown in block 606 to test whether it has run out. If time remains, the transceiver remains in the idle state and continues checking for the receipt of a packet as designated in block 586. If however, the times has run out, then the transceiver enters the renaissance state 700.

Upon detecting true receipt of a packet as signalled by line 223, the transceiver then checks to be sure the packet error checker 240 found no errors, and the address recognizer 242 determined that this was an appropriate packet for this transceiver. The packet type is then detected by type recognizer 216 and examined by the state control logic 222 as designated in block 590 of FIG. 5. Receipt of a packet type 01, a network permit, initiates the transceiver sending a packet type 02 to the sender to acknowledge receipt of the network access permit. Specifically, the state control logic 222 communicates the packet type and destination for the packet in the output buffer 209 via line 252 and initiates the transmission via line 221 to transmitter controller 208. The transceiver then enters the transmit state, block 500 in FIG. 5.

Should the received packet be a request for communication, type 03 (RQT) packet, then the transceiver will move to the receive state as shown by the sequence blocks 598 and 620 in FIG. 5.

If neither of the two appropriate message types were received, then the transceiver will wait for the next valid packet to be received.

TRANSMIT STATE

FIG. 6 overviews the logic of the transceiver in the transmit state and begins with the entry via block 500. The state control logic enters the number t-2 into a timer to begin counting down to assure that it does not exceed its allocated time quantum, clock 502. As per block 502, control logic 222 exaines line 220; and if the digital using device 160 has set this line true, it will proceed to send out the data packet stored in output buffer 209. If line 220 signifies that no data is ready for transmission, then the transceiver enters the permit transfer state, block 530.

To transmit the data in output buffer 209 the transceiver first sets timer t-1 and sends a request to transmit (RQT) packet, type 03, to the destination address, as designated by block 504. Blocks 505 and 507 of FIG. 6 describe the sequence of waiting for receipt of a type 07 (RR) packet from the destination. If no such packet is received within time limit t-1, the transceiver moves to the permit transfer state, shown by block 530. Receipt of the ready to receive message, type 07 packet, enables the transceiver to begin data transmission, moving to block 506 in FIG. 6.

As shown in blocks 506, 508, 509, and 510 of FIG. 6, the transceiver proceeds to send a packet to the destination wait for an acknowledgement, and check for accurate communication. If acknowledgement is not received on a timely basis, then the transceiver statuses this condition via line 239 to digital using device 160 and enters the permit transfer state 530. Furthermore, should the received packet be other than the desired data acknowledge, type 05, then this error status is also provided via line 239 to the digital using device 160 and the transceiver enters the permit transfer state 530. Normal error free communication results in the receipt of a positive data acknowledgement in the transceiver as shown in block 510; and the subsequent checking for available time, block 516, and available packets to be sent, block 514. If the time quantum has been used up, the transceiver enters the permit transfer state 530. If there is more time available, then any remaining packets of the given message are attempted to be transmitted; and, time permitting, packets for other destinations may begin to be transmitted as well. Other destinations require the re-establishment of resource availability as shown by the flow of logic through block 514 returning to block 502.

PERMIT TRANSFER STATE

FIG. 7 provides a overview of the logical flow for the transceiver in the permit transfer state. Block 530 represents the entry point to the state. As shown in block 532 the transceiver obtains the address for the next transceiver to receive the permit from the "next address" logic, 207 in FIG. 2. In its simplest form, the next address logic is a digital counter which begins with the address assigned to that transceiver via line 244 of FIG. 2 and adds one incrementally. This technique will yield a complete list of addresses for all possible transceivers that may be on the network. In addition, this will provide a "round-robin", equal priority access methodology for the network.

Once the state control logic has the next address, it resets timer t-1, block 536, and sends a message type 01 to the "next address" as a destination. Blocks 544 and 548 in FIG. 7 represent the checking and waiting that are performed within the transceiver searching for acknowledgement that the destination accepts the network permit. Acceptance of the network access permit by the destination is signified by its sending to the type 02 message which is recognized by the transceiver, block 216 of FIG. 2, and allows the transceiver to re-enter the idle state as shown in blocks 548 and 580.

It may happen that the terminal which is the designated recipient of the permit is not in operation (It may be shut down for maintenance.) in which case the system is able to compensate for this failure of a terminal. The inoperative terminal does not accept the permit nor acknowledge receipt of the permit.

The lack of success in receipt of a type 02 acknowledgement message from the destination address results in the transceiver attempting to establish permit transfer with another transceiver on the network. As shown in block 544, the transceiver returns to block 432 in the logical flow and obtains another address to which it will offer the network access permit. This feature enables protection from network faults wherein one of the digital using devices is inoperable and fails to acknowledge the offer of a permit.

RENAISSANCE STATE

The Renaissance State is a state for the transceiver wherein it attempts to recreate a network access permit. The transceiver now performs in a mode which assumes that communication failures will occur on the network and that other transceivers may also be attempting to create a permit for the network. FIG. 9 provides an overview of the renaissance state and begins with entry via block 700. The transceiver will first attempt to communicate with the destination for which it has a message to be sent. For this reason, as shown in block 704, the transceiver first evaluates whether flag 220 is signifying that the digital using device has a message in the output buffer ready to send. If this is true, the destination address of that message is utilized for a type 03 message and normal transmission in initiated. Timer t-1 is set, block 716, and the transceiver waits for receipt of a type 07 packet from the destination signifying that it has correctly head the request for communication being sent to it. What is unique during this process, as compared to the transmit state, is that the collision detector 204 in FIG. 2 continually monitors the channel for collisions, and if a collision occurs, the transceiver returns to the idle state block 580. If no such collision occurs, and a valid type 07 packet is received then the transceiver moves to the transmit state, as shown in block 724 to block 524 of FIG. 9, since it now has created and currently holds the network access permit.

In those cases, when no data is ready to be sent by the digital using device 160, but the network has been inactive for a period of time in excess of threshold t-3, then the entry into the renaissance block 700 results in a sequence of logic similar to that described above but with no message to be sent. As shown in block 704 of FIG. 9, the transceiver moves through a sequence of steps blocks 729 through 734 which essentially mimic the permit transfer state operation. A packet type 01 is sent out to a specific destination and when an acknowledgement, message type 02 is received, then the transceiver returns to the idle state having re-established a deterministic network access strategy. As shown via blocks 732–734 and 729, failure to establish error free communication and permit transfer to the first destination address results in the subsequent attempt to establish communication with the remaining addresses in the network. As before, the detection of a collision in the network results in transfer to the idle state as shown in block 732.

RECEIVE STATE

The Receive State has two basic hand shaking sequences with the sending transceiver as shown in FIG. 8. After entering this state via block 620, the transceiver tests whether the digital using device 160 is capable of handling the incoming message. If this is not true, then a type 06 (NR) packet is sent back to the source transceiver as evidenced by clock 624 and 628, with the transceiver returning to the idle state block 580. If the digital using device 160 does have available resources, then a positive status is indicated by sending a type 07 message to the source transceiver, block 632, and the transceiver prepares to receive data packets from the source.

The second sequence of hand shaking is now initiated for each data packet sent by the source. As shown in FIG. 8, blocks 636,640, and 644, the transceiver sets a timer and waits for receipt of a type 10 data packet. If no data packet is received and the timer times out, then the transceiver returns to the idle state, 580. As shown in block 640, upon receipt of the packet in the input buffer 205 as signified via line 223 in FIG. 2; the correct address, signified via line 228, is checked; and the type of packet, as denoted via line 227, is verified. Then the packet error checker 240 checks for the accuracy of the data packet, as designated in block 648 in FIG. 8. If no error is detected, then a type 05 data acknowledge packet is sent to the source transceiver as denoted by block 656, and the input data ready flag 214 is set true by the state control logic 222. Should an error be detected, then a negative acknowledgement packet, type 08, is sent to the source, as designated by blocks 664. In either case, the transceiver returns to reset the timer t-3, block 636, and awaits reception of a new packet.

It is possible, as shown in FIG. 8, to have the transceiver return to the idle state, block 580, by an examination of the next packet sequence number via line 223, FIG. 2. As shown in block 660 of FIG. 8, the transceiver can return directly to the idle state upon detection that a particular packet is the end of a message. Per FIG. 3, packet type 10 and 11 have the next packet sequence number set to "0" to designate the end of the message.

MULTIPOINT COMMUNICATIONS

The transceiver implementation described thus far has supported a point-to-point mode of communication wherein there is acknowledgement of each packet transmitted. There is also the opportunity for multiple recipients to receive the same packet and thus provide an efficiency for the network. This efficiency is enabled because of the shared bus architecture and these modes of communication will herein below be referred to as broadcast modes. Therefore, this section describes an alternate implementation of the transceiver control logic which supports broadcast communications.

TRANSMIT STATE WITH UNIVERSAL BROADCAST MODE

It is possible to include a broadcast mode of transmission on the network via a simple alteration to the basic transmit and receive state as described hereinabove. FIG. 10 shows the overall logical flow for control of a transceiver which is operating in the broadcast mode. As can be seen in FIG. 10, the logical flow is similar to that for the basic point-to-point transmitter state. What is unique is that a data packet type 10 with a destination address of "0" will be sent out for all transceivers to hear and no acknowledgement will be attempted.

As shown via 503, in FIG. 10, the output buffer 209 will detect broadcast packets sent to it and signal via line 243 that the broadcast transmission is desired. The state control logic then sets a destination address for a type 04 message to be 0, and sends it out once on the network. This sequence is shown in FIG. 10 via blocks 503, 507 and 518.

A small delay may be desired to allow receiving transceivers time to prepare for receipt of packets, however in most cases this time delay, designated block 519, will not be necessary. The transceiver then begins to send out the data packet, type 10 with destination address "0". As in the normal transmit state, the quantum timer is checked, block 516, and the transceiver attempts to send any remaining packets until it runs out of time, block 516, or packets for broadcast transmission, block 523.

RECEIVE STATE WITH UNIVERSAL BROADCAST MODE

As with the transmit state, the receive state for universal broadcast is similar to that for point-to-point packet communication. FIG. 11 provides a detail logical flow for the receive state with the universal broadcast mode. The unique characteristic of this mode is that the acknowledge sequences are eliminated. As shown in block 625 and 628, the transceiver logic for response to a request for communication, packet type 04, is handled differently for a universal broadcast packet. If the address recognizer, 242, detects a universal broadcast message, and the packet type recognizer, 216, detects a type 04, message, then as shown in block 625, the transceiver immediately returns to the idle state if resources are not available as designated by flag 212. On the other hand, if address recognizer, 242, detects a normal destination address, then the response by the transceiver when resources are not available is to send a type 06 packet to the source as shown in block 628 of FIG. 11.

Similarly in the case when the digital using device 160 signifies via resource available flag 212 that it is able to receive a message, non-broadcast messages are handled as they were in the normal receive state, FIG. 8. For broadcast message, no type 07 acknowledgement packets are sent, and the logic, as shown in FIG. 11, simply proceeds to receive data packets and stay in that process until the end of the message or the timer direct that the transceiver return to the idle state, 580.

TRANSMIT STATE FOR FINITE SET BROADCAST MODE

In certain instances, it is efficient to broadcast a message to a subset of the network. Hence, the transceiver attempts to communicate not just to a single transceiver one at a time, nor to all the transceivers in the universal broadcast mode; but to a fixed subset of the network. This mode of operation can be implemented via a simple alteration to the logical flow of the states of the transceiver and a simple enhancement to the message format as described in FIGS. 3a–b. Fundamentally, the transmit state for finite set broadcast is similar to the logical flow described in FIG. 6. The unique characteristics are shown in FIG. 12.

Block 786 of FIG. 12 is equivalent to block 506 of FIG. 6. Both represent the transmission of the data packet which in FIG. 12 is a type 11 message with all destinations included. The logical operations leading up block 786 are simply a sequence of "hand shakes" comprised of type 04 and type 07 packets as in the normal non-broadcast transmit state. The transceiver attempts to get acknowledgement from each of the destination addresses and communicates the results of the via line 239 to the digital using device 160 as signified by block 784 in FIG. 12.

An equivalent hand shake is performed at the end of data packet transmission beginning with block 790 and ending with block 798 which again reports the conclusion of this multi-point communication attempt to the digital using device via line 239. When either the time quantum allotment to the transceiver runs out or the message is complete, the transceiver returns to the permit transfer state.

In the method described here, the network facilitates sending messages to more than one node simultaneously. As understood by those skilled in the art, this broadcast capability can be enabled for subsets of the network which includes all or a selected group of nodes on the network. Implementation is facilitated by simply altering the set of addresses "recognized" by the address recognizer 242 in the transceivers.

RECEIVE STATE FOR FINITE SET BROADCAST MODE

For the special case when multi-point communications to a subset of the network is a desired mode, the transceivers receive state is altered in a similar way to that of the transmit state. For a given data packet, multiple recipients will be polled for their acknowledgement. For this reason, the received state for a multi-point data packet, type 11, must now wait for solicitation of its acknowledgement after receipt of a data packet.

Comparison of FIG. 13 with FIG. 8 shows the overall similarity of the logic. The differences stem from the fact that the interface now sends acknowledgements only when solicited with a Solicit Acknowledgement (SA) message. This control is necessary in order to prevent collisions between acknowledgements from multiple terminals. A timer is set before waiting for a Solicit Acknowledgement (SA) message in order to prevent the transceiver from getting locked in this state.

The control logic is now described. Block 852 checks if the reception resource is available. If not, the interface sets a timer (block 854) and waits for the reception of Solicit Acknowledgement (SA) message (blocks 856 and 858). Upon receiving an SA message, it sends a Not Ready (NR) message and reverts to the idle state. If an SA message is not received within the timer interval, the interface transitions to the IDLE state to prevent the transceiver from getting locked in this state.

If the resources required for reception are available, the control logic 222 sets a timer and waits for a Solicit Acknowledgement (SA) packet type 09. When an SA is received, the transceiver sends a Ready to Receive (RR) and waits to receive a data packet. When a data packet is received, it performs an error check via error checker 240 (Block 884) and waits to receive a Solicit Acknowledgement (SA) message (blocks 886 and 888). When an SA is received, the interface sends either a Negative Acknowledge (ND) (block 894) or an Acknowledge Data (DA), depending upon the outcome of the error check. If the data was correctly received, the control logic checks the data packet for the sequence number of the next data packet. If the current data packet is the last data packet, the interface transitions to the IDLE state. If more data packets await transmission, control passes to block 874 and the reception cycle repeats.

Three modes of communication (single point-to-point, universal broadcast, and finite set broadcast) have been described above, with separate descriptions for each. For one skilled in the art, it is a simple matter to combine all or a subset of these three communication modes into a unified control logic for a network.

ERROR TOLERANCE IN THE NETWORK

There are two major classes of errors in the network. The first case is where more than one terminal may erroneously assume ownership of the permit and commence transmission. Should a collision ever be detected by the transceiver of a transmitting node, the transceiver communicates this status to the digital using device via line 239 and enters the IDLE state.

The second major class of errors occurs when a transceiver with a permit fails to pass on the permit. This is handled by the processing logic of the IDLE state, where, if no activity has been sensed on the line for a given timer interval, control passes to the RENAISSANCE state. The interface assumes permit ownership and attempts to restart communications.

PRIORITIZED NETWORK ACCESS

The protocol described above provides for each node to have an equal chance at network access because of the sequential (round robin) permit transfer from node to node. This priority access protocol is called the Beta prioritization scheme to differentiate it from the asynchronous, contention with collision, access procedure exemplified by the Xerox Ethernet, and referred to herein below as the Alpha protocol.

It is fundamental to the permit based network access procedure of this invention that truly prioritized access for a subset of nodes can be enabled if needed in a given network. For example, digital telephone service places real time communication burdens on a network, and hence it may be deemed necessary to prioritized telephone node service. Thus for example, in a network with telephone nodes numbered 1-10, and display terminal nodes numbered 11-20 one could define a two level priority access scheme wherein the token is passed from telephone node to telephone node in a round robin sequence with a single display terminal being given the permit to use the network only per cycle of the priority loop. Node number 1, using the "next address" logic in its transceiver offers the permit sequentially to each data terminal in the lower priority (data terminals) set of nodes (11-20). Each of these lower priority nodes returns the permit to the source instead of the next higher address. Node 1 circulates the permit to all high priority nodes (1 to 2, 2 to 3, . . . 10 to 1) before allowing another lower level node to have the permit. The permit will therefore pass to terminals in the following sequence, 1,11,2,3,4,5,6,7,8,9,10,1,12,2,3,4,5,6,7,8,9,10,1,13,2, . . . ). The result (defined as the Gamma class of priority access procedures) is a pair of round robin service access procedures with one set of nodes having access priority over the other set.

To those skilled in art, it will be clear that alternate priority access procedures beyond the Gama example above are a capability of this permit based communication system invention.

RESOURCE RESERVATION LOGIC

For certain types of messages, such as high resolution, scanned imagery (containing for example 0.5 million bytes) to be output on page synchronous printing devices, it is efficient to send such messages only when there is sufficient buffer space available or the printing device is free to output the information. For cases when less than a printed page of buffer space is available, the page cannot be prepared for printing at the recipient and the printer may ignore the portion of the data it already has received and require full retransmission. Also, some page synchronous printers have only a small amount of buffering, and thus if a page cannot be printed as it is received, then it is useless to begin sending the message. In cases such as these, the state transition logic as described above can be utilized to pseudo synchronize the resources requirements of distant devices. The transmit and receive states contain a handshaking sequence at the beginning of each message transmission comprised of the RQT (Request To Transfer) and RR (Ready to Receive) packets which guarantees that the receiving digital using device has the resources to utilize the transmitted data. This capability can therefore be utilized to synchronize the sending of messages to the receiving device only when the device can handle them. Thus, in the example of the digital printer with limited buffer space, the Ready to Receive packet would not be sent until a print cycle on that device was ready to start, thereby enabling the receiving device to use the message that is sent to it and avoid buffer overruns with the large size of the message data and subsequent retries.

The novel concept enhancement that is to be focussed on in this section is that the receiving device can use the RQT packet as a signal for it to begin to reserve resources for an impending transmission. Thus for example, the digital using device that does not have buffer space now for a complete message can respond with an NR (Not Ready) packet, but begin to save up that required buffer space so that the next time an RQT is sent, it may respond with an RR and receive the message. In this way, resource requirements can be synchronized to some degree in distant digital using devices and increase the efficiency of the communication system.

The resource reservation principle is useful for applications beyond that exemplified above. Sending devices may attempt reservation for many and various resources including such things as the next page print cycle in a page synchronous printer. Furthermore, the resource reservation procedure may be utilized for a group of recipients as well as for a single recipient.

COPYSENDER AND PRINTER DEVICES WITH LOCAL AND REMOTE OUTPUT TRAYS

As shown in FIG. 1, a number of different devices may reside on the network. Device number 130 is a copysender which has the capability of being both a local copier of documents and an output device for information being sent electronically to that node. The copysender is shown with at least two output trays, one for local printing/copying of pages, and the second for remote pages of material being output at that location. For devices such as this, this invention proposes a fundamental principle that they be capable of having at least two distinct output trays. This allows for page asynchronous printing of both local information from for example the platen, and distant information sent via the communication network. The principle of system design highlighted here is that these output devices can now interleave local and remote page printing tasks asynchronously.

Figure 14:
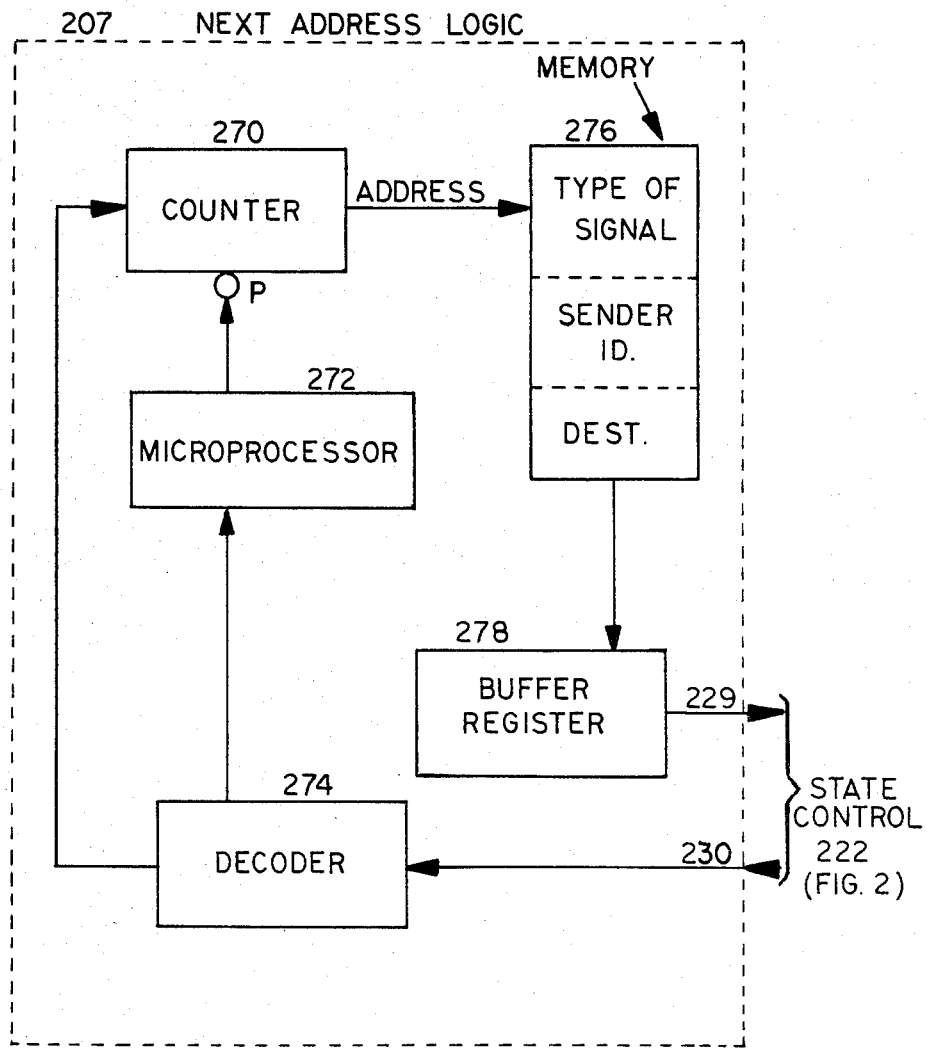
FIG. 14 is a block diagram of permit generation circuitry.

FIG. 14 shows a more detailed view of the next address logic unit 207 (previously shown in FIG. 2) for the generation of the permit. The logic unit 207 comprises a counter 270, a microprocessor 272, a decoder 274, a memory 276 and a buffer register 278. In operation, the memory 276 stores the contents of a digital word which serves as the permit signal in accordance with the format disclosed above with reference to FIG. 3. Thus, as shown by the format 300, the permit signal is composed of a set of digits which identify the signal as being a permit. There follows a set of digits identifying the sending station, and then a further set of digits identifying the intended receiving station or destination of the permit. The first two set of digits are stored in the memory 276. In addition, the memory 276 stores the destinations of all the other stations of the system. The counter 270 addresses the memory 276 to produce the component parts of the permit, the memory 276 outputting the foregoing three sets of digits to the buffer register 278. Accordingly, the register 278 contains the permit with the appropriate destination as directed by the address in the counter 270.

The address can be provided by the counter 270 without direction from other circuitry in the case wherein the permit is to be passed to the very next station. In this case, the counter 270 is to be incremented by a count of 1 to extract the destination of the next transceiver from the memory 276. In a more complex situation, such as the above-described prioritized-network-access, the microprocessor 272 utilizes the algorithm of prioritized-network-access to obtain the identity of the next transceiver, and presets the counter 270 to the correct address by applying the requisite count to the preset terminal P. The foregoing operation is implemented in response to a command signal from the state control logic unit 222 via line 230 to the decoder 274. The decoder 274 decodes the command signal on line 230 to provide the increment command signal for the counter 270, or a signal directing the microprocessor 272 to provide the value of the next address for the memory 276. The resultant permit is coupled from the register 278 to the state control logic unit 222 via line 229.

It is to be understood that the above described embodiment of the invention is illustrative only, and that modifications thereof may occur to those skilled in the art. Accordingly, this invention is not to be limited to the embodiment disclosed herein, but is to be limited only as defined by the appended claims.

What is claimed is:

1. A data communication system comprising:
   a communication medium including a plurality of taps for making connection therewith, said medium providing for the coupling of signals along said taps;
   a plurality of transceivers connected by respective ones of said taps to said medium, each of said transceivers including means for transmitting a signal into said medium and means for receiving a signal communicated via said medium, said transceivers and said medium constituting a communication network;
   interface means coupled to respective ones of said transceivers for interfacing said transceivers with utilization devices;
   each of said transceivers including permit means comprising circuitry for generating a network-access permit in the form of a digital signal, and means for passing the permit via said transmitting means and said medium from one of said transceivers to another of said transceivers;
   each of said transceivers further comprising permit-checking means for enabling transmission by said transmission means, in any one of said transceivers said enabling of said transmission being in response to the presence of said permit at said one transceiver;
   each of said transceivers further comprising means for detecting errors when more than one transceiver attempts to utilize said medium at the same time, said error detecting means signaling when a transceiver assumes ownership of the permit, and logic means including means to reestablish error free network communication;
   said logic means in each of said transceivers designating a sequence of communication among the transceivers while permitting an addition and a deletion of transceivers to the network without need to reinitialize other ones of the transceivers in the network
   whereby any one of said transceivers is enabled to transmit a message to another of said transceivers only upon the presence of said permit at said one transceiver so as to prevent a concurrent transmission of messages by more than one receiver.

2. A data communication system comprising:
   a communication medium including a plurality of taps for making connection therewith, said medium providing for the coupling of signals along said taps;
   a plurality of transceivers connected by respective ones of said taps to said medium, each of said transceivers including means for transmitting a signal into said medium and means for receiving a signal communicated via said medium, said transceivers and said medium constituting a communication network;

interface means coupled to respective ones of said transceivers for interfacing said transceivers with utilization devices;

each of said transceivers including permit means comprising circuitry for generating a network-access permit in the form of a digital signal, and means for passing the permit via said transmitting means and said medium from one of said transceivers to another of said transceivers;

each of said transceivers further comprising permit-checking means for enabling transmission by said transition means, in any one of said transceivers said enabling of said transmission being in response to the presence of said permit at said one transceiver;

whereby any one of said transceivers is enabled to transmit a message to another of said transceivers only upon the presence of said permit at said one transceiver so as to prevent a concurrent transmission of messages by more than one receiver; and wherein any one of said transceivers, said permit means comprises:

activity sensing means for sensing the presence of a signal propagating in said medium, said sensing means being responsive to the absence of a permit transmission in said medium during a predetermined interval of time to designate the failure of a transceiver to pass the permit;

said sensing means including collision detecting means coupled to said transmitting means for detecting the simultaneous presence of both a transmitted signal of said transmitting means and a medium signal propagating in said medium, said simultaneous presence being a collision, said collision detecting means providing a collision signal upon detection of a collision, and wherein such collision occurs during a contention mode of access to said network initiated by said sensing means upon said designation of the failure, and during which mode of access said permit circuitry is generating a permit, said permit means including collision logic means for interrupting generation of a permit by said circuitry in response to said collision signal.

3. A system according to claim 2 wherein said permit passing means includes means for selecting one or more of said plurality of transceivers for receipt of the permit in accordance with a predesignated scheme of priority.

4. A system according to claim 1 wherein said permit-passing means of one of said transceivers addresses a plurality of other ones of said transceivers, sequentially, for receiving said permit on a non-priority basis upon the conclusion of a transmission by said transmitting means.

5. A data communication system comprising:
a communication medium including a plurality of taps for making connection therewith, said medium providing for the coupling of signals along said taps;

a plurality of transceivers connected by respective ones of said taps to said medium, each of said transceivers including means for transmitting a signal into said medium and means for receiving a signal communicated via said medium, said transceivers and said medium constituting a communication network;

interface means coupled to respective ones of said transceivers for interfacing said transceivers with utilization devices;

each of said transceivers including permit means comprising circuitry for generating a network-access permit in the form of a digital signal, and means for passing the permit via said transmitting means and said medium from one of said transceivers to another of said transceivers;

each of said transceivers further comprising permit-checking means for enabling transmission by said transition means, in any one of said transceivers said enabling of said transmission being in response to the presence of said permit at said one transceiver;

whereby any one of said transceivers is enabled to transmit a message to another of said transceivers only upon the presence of said permit at said one transceiver so as to prevent a concurrent transmission of messages by more than one receiver; and wherein said permit-passing means of one of said transceivers addresses a predesignated one of said transceivers for receiving said permit on a priority basis transfer upon the conclusion of a transmission by said transmitting means, thereby providing a prioritized access to said communication medium by utilization devices which may be coupled to said transceivers.

6. A data communication system comprising:
a communication medium including a plurality of taps for making connection therewith, said medium providing for the coupling of signals along said taps;

a plurality of transceivers connected by respective ones of said taps to said medium, each of said transceivers including means for transmitting a signal into said medium and means for receiving a signal communicated via said medium, said transceivers and said medium constituting a communication network;

interface means coupled to respective ones of said transceivers for interfacing said transceivers with utilization devices;

each of said transceivers including permit means comprising circuitry for generating a network-access permit in the form of a digital signal, and means for passing the permit via said transmitting means and said medium from one of said transceivers to another of said transceivers;

each of said transceivers further comprising permit-checking means for enabling transmission by said transition means, in any one of said transceivers said enabling of said transmission being in response to the presence of said permit at said one transceiver;

whereby any one of said transceivers is enabled to transmit a message to another of said transceivers only upon the presence of said permit at said one transceiver so as to prevent a concurrent transmission of messages by more than one receiver; and wherein each of said transceivers includes acknowledgement means coupled to said receiving means for generating an acknowledgement signal upon receipt of the permit; and wherein upon the failure of an addressed receiver to acknowledge receipt of the permit within a predesignated amount of time, said permit passing means addresses another of said transceivers.

7. A system according to claim 1 further comprising timing means coupled between said transmitting means and said permit passing means for enabling said transmitting means to transmit data during an interval of time of predetermined duration followed by activation of said permit passing means to pass the permit.

8. A system according to claim 7 wherein said timing means includes means for adjusting said predetermined duration of said interval.

9. A system according to claim 1 wherein each of said transceivers includes buffer storage means for storing data provided by a utilization device prior to transmission of such data via said medium, thereby providing an asynchronous communication capability.

10. A data communication system comprising:
a communication medium including a plurality of taps for making connection therewith, said medium providing for the coupling of signals along said taps;
a plurality of transceivers connected by respective ones of said taps to said medium, each of said transceivers including means for transmitting a signal into said medium and means for receiving a signal communicated via said medium, said transceivers and said medium constituting a communication network;
interface means coupled to respective ones of said transceivers for interfacing said transceivers with utilization devices;
each of said transceivers including permit means comprising circuitry for generating a network-access permit in the form of a digital signal, and means for passing the permit via said transmitting means and said medium from one of said transceivers to another of said transceivers;
each of said transceivers further comprising permit-checking means for enabling transmission by said transmission means, in any one of said transceivers said enabling of said transmission being in response to the presence of said permit at said one transceiver;
whereby any one of said transceivers is enabled to transmit a message to another of said transceivers only upon the presence of said permit at said one transceiver so as to prevent a concurrent transmission of messages by more than one receiver; and wherein
each of said transceivers includes acknowledgement means coupled to said receiving means for generating an acknowledgement signal at the conclusion of the reception of a message.

11. A data communication system comprising:
a communication medium including a plurality of taps for making connection therewith, said medium providing for the coupling of signals along said taps;
a plurality of transceivers connected by respective ones of said taps to said medium, each of said transceivers including means for transmitting a signal into said medium and means for receiving a signal communicated via said medium, said transceivers and said medium constituting a communication network;
interface means coupled to respective ones of said transceivers for interfacing said transceivers with utilization devices;

each of said transceivers including permit means comprising circuitry for generating a network-access permit in the form of a digital signal, and means for passing the permit via said transmitting means and said medium from one of said transceivers to another of said transceivers;
each of said transceivers further comprising permit-checking means for enabling transmission by said transition means, in any one of said transceivers said enabling of said transmission being in response to the presence of said permit at said one transceiver;
whereby any one of said transceivers is enabled to transmit a message to another of said transceivers only upon the presence of said permit at said one transceiver so as to prevent a concurrent transmission of messages by more than one receiver; and wherein
a common address is provided for the simultaneous addressing of a plurality of said transceivers, and wherein said permit-passing means includes means for inserting said common address in a digital signal packet including said permit.

12. A system according to claim 11 wherein said plurality of transceivers includes all of said transceivers.

13. A data communication system comprising:
a communication medium including a plurality of taps for making connection therewith, said medium providing for the coupling of signals along said taps;
a plurality of transceivers connected by respective ones of said taps to said medium, each of said transceivers including means for transmitting a signal into said medium and means for receiving a signal communicated via said medium, said transceivers and said medium constituting a communication network;
interface means coupled to respective ones of said transceivers for interfacing said transceivers with utilization devices;
each of said transceivers including permit means comprising circuitry for generating a network-access permit in the form of a digital signal, and means for passing the permit via said transmitting means and said medium from one of said transceivers to another of said transceivers;
each of said transceivers further comprising permit-checking means for enabling transmission by said transition means, in any one of said transceivers said enabling of said transmission being in response to the presence of said permit at said one transceiver;
whereby any one of said transceivers is enabled to transmit a message to another of said transceivers only upon the presence of said permit at said one transceiver so as to prevent a concurrent transmission of messages by more than one receiver; and wherein
a first of said transceivers comprises multifunction circuitry utilized via a time shared process in the performance of each of a plurality of functions, the permit means in a second of said transceivers comprising means for inserting a "request-to-submit" signal in a packet containing said permit, said packet further including the address of said first transceiver, and wherein said first transceiver includes means for generating a "ready-to-receive" signal in reponse to receipt of the "request-to-transmit" signal when said multifunction circuitry is available for receiving a message from said second transceiver.

14. A system according to claim 13 wherein said multifunction circuitry is a memory time-shared among a plurality of functions.

15. A communication system comprising:
a set of stations;
a communication medium interconnecting said stations, each of said stations including transceiver means for transmitting signals on said medium to other ones of said stations and for receiving signals via said medium from other ones of said stations;
each of said transceiver means including enabling means responsive to a permit signal for the enabling of the transmission of a signal into said medium by the transceiver; and wherein
said system further comprises means for passing said permit signal from station to station among said set of stations to insure transmission of signals via said medium by only one station at a time;
means for detecting failures wherein multiple stations attempt to use the system, and also failures characterized by a lack of attempt by any station to use said system, and logic means coupled to said failure detecting means including means to reestablish error-free communication; and
said logic means designating a sequence of communication among the stations while permitting an addition and a deletion of stations on the system without need to reinitialize other ones of the stations.

16. A system according to claim 15 further comprising timing means for activating said passing means at the conclusion of an interval of transmission by one of said stations.

17. A system according to claim 15 wherein one of said transceiver means includes means for generating a permit signal for transference of a permit signal to another of said stations.

18. A data communication system comprising:
a set of stations;
a communication medium interconnecting said stations, each of said stations including transceiver means for transmitting signals on said medium to other ones of said stations and for receiving signals via said medium from other ones of said stations;
each of said transceiver means including enabling means responsive to a permit signal for the enabling of the transmission of a signal into said medium by the transceiver; and wherein
said system further comprises means for passing said permit signal from station to station among said set of stations to insure transmission of signals via said medium by only one station at a time, one of said transceiver means including means for generating a permit signal for transference of a permit signal to another of said stations; and wherein
each of said transceiver means includes means for addressing another of said stations and means for decoding an address to enable the passing of a permit signal to a predesignated station on a priority basis.

19. A fault-tolerant method of communicating data signals in a network of stations that is easily expanded or altered, and is connected by a communication medium comprising:
generating a permit;
passing said permit via said medium to various ones of said station;
retaining said permit at a station from which a data transmission is to be made via said medium to another of said stations;
enabling said transmission via said permit;
releasing said permit to another station;
detecting errors when multiple stations attempt to use the network and establishing sole ownership of the permit;
detecting errors when no station attempts to use the network and establishing a permit with a single station;
detecting the addition of a new station to the network and passing the permit to said new station at an appropriate time;
detecting a deletion of a station from the network and passing the permit to the next appropriate station in the network;
whereby each of a plurality of said stations is enabled to transmit, one-by-one so as to avoid collision among data transmissions from respective ones of said stations.

20. A method according to claim 19 further comprising the storing of data prior to a transmission so as to have the data ready for transmission when the permit is received.

21. A method of communicating data signals in a network of stations connected by a communication medium comprising:
generating a permit;
passing said permit via said medium to various ones of said station;
retaining said permit at a station from which a data transmission is to be made via said medium to another of said stations;
enabling said transmission via said permit;
releasing said permit to another station, whereby each of a plurality of said stations is enabled to transmit, one-by-one so as to avoid collision among data transmissions from respective ones of said stations; and further comprising
a step of addressing a specific one of said stations for receipt of the permit in a priority sequence of data transmissions.

* * * * *